United States Patent
Kopula et al.

(10) Patent No.: US 12,252,134 B1
(45) Date of Patent: Mar. 18, 2025

(54) TRAINING AND UTILIZING A MACHINE-LEARNING MODEL TO AUTOMATICALLY PREDICT AN IDENTITY OF A DRIVER BASED ON SEAT POSITION

(71) Applicant: STATE FARM MUTUAL AUTOMOBILE INSURANCE COMPANY, Bloomington, IL (US)

(72) Inventors: Suriya Kopula, Cumming, GA (US); Jeffrey Wilson Stoiber, Atlanta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 410 days.

(21) Appl. No.: 17/075,479

(22) Filed: Oct. 20, 2020

(51) Int. Cl.
*B60W 40/09* (2012.01)
*B60R 16/037* (2006.01)
(Continued)

(52) U.S. Cl.
CPC .......... *B60W 40/09* (2013.01); *B60R 16/037* (2013.01); *G06F 18/214* (2023.01); *G06F 18/23* (2023.01);
(Continued)

(58) Field of Classification Search
CPC .......... B60W 40/09; B60W 2540/043; B60W 2540/223; G06N 20/00; B60R 16/037;
(Continued)

(56) References Cited

U.S. PATENT DOCUMENTS 5,304,809 A   4/1994   Wickersheim
5,697,001 A   12/1997  Ring et al.
(Continued)

FOREIGN PATENT DOCUMENTS

CN      109145982 A   *   1/2019
WO      WO-2018048870 A1    3/2018

OTHER PUBLICATIONS

Cost Containment, Product and Solutions for the Property and Casualty Insurance Industry, Computer Sciences Corporation (1999).
(Continued)

*Primary Examiner* — Jelani A Smith
*Assistant Examiner* — Alyssa Rorie
(74) *Attorney, Agent, or Firm* — MARSHALL, GERSTEIN & BORUN LLP

(57) ABSTRACT

The described methods and systems enable automatic detection of a driver's identity based on an analysis of position or orientation data pertaining to elements of a cockpit that the driver tends to personalize when driving according to her preferences. Example position or orientation data may include data pertaining to seat or mirror position or orientation. Some of the disclosed embodiments utilize machine-learning techniques to train a machine-learning (ML) model to automatically detect or predict a driver's identity based on learned patterns (e.g., based on preferred positions or orientations the ML model has learned for the driver.) If desired, one or more embodiments may implement unsupervised learning techniques, supervised learning techniques, or both unsupervised and supervised learning techniques.

20 Claims, 11 Drawing Sheets

(51) Int. Cl.
  *G06F 18/214* (2023.01)
  *G06F 18/23* (2023.01)
  *G06N 20/00* (2019.01)
(52) U.S. Cl.
  CPC ....... *G06N 20/00* (2019.01); *B60W 2540/043* (2020.02); *B60W 2540/223* (2020.02)
(58) Field of Classification Search
  CPC .. G06K 9/6218; G06K 9/6256; G06F 18/214; G06F 18/23
  See application file for complete search history.

(56) References Cited

U.S. PATENT DOCUMENTS

| | | | |
|---|---|---|---|
| 5,950,169 | A | 9/1999 | Borghesi et al. |
| 6,181,837 | B1 | 1/2001 | Cahill et al. |
| 6,574,377 | B1 | 6/2003 | Cahill et al. |
| 7,130,066 | B1 | 10/2006 | Kanematu |
| 7,343,307 | B1 | 3/2008 | Childress |
| 7,752,286 | B2 | 7/2010 | Anderson et al. |
| 7,809,587 | B2 | 10/2010 | Dorai et al. |
| 7,885,829 | B2 | 2/2011 | Danico et al. |
| 7,889,931 | B2 | 2/2011 | Webb et al. |
| 7,953,615 | B2 | 5/2011 | Aquila et al. |
| 7,984,500 | B1 | 7/2011 | Khanna et al. |
| 8,265,963 | B1 | 9/2012 | Hanson et al. |
| 8,284,194 | B2 | 10/2012 | Zhang et al. |
| 8,370,373 | B2 | 2/2013 | Yamamoto |
| 8,374,957 | B1 | 2/2013 | Garcia et al. |
| 8,401,879 | B1 | 3/2013 | Kazenas |
| 8,510,196 | B1 | 8/2013 | Brandmaier et al. |
| 8,527,305 | B1 | 9/2013 | Hanson et al. |
| 8,537,338 | B1 | 9/2013 | Medasani et al. |
| 8,543,486 | B2 | 9/2013 | Donoho et al. |
| 8,651,206 | B2 | 2/2014 | Slawinski et al. |
| 8,756,085 | B1 | 6/2014 | Plummer et al. |
| 8,818,572 | B1 | 8/2014 | Tofte et al. |
| 8,861,808 | B2 | 10/2014 | Kulcke et al. |
| 8,872,818 | B2 | 10/2014 | Freeman et al. |
| 8,874,454 | B2 | 10/2014 | Plummer et al. |
| 8,931,144 | B2 | 1/2015 | Freeman et al. |
| 9,002,719 | B2 | 4/2015 | Tofte |
| 9,082,015 | B2 | 7/2015 | Christopulos et al. |
| 9,098,655 | B2 | 8/2015 | Plummer et al. |
| 9,131,224 | B1 | 9/2015 | Freeman et al. |
| 9,262,564 | B2 | 2/2016 | Plummer et al. |
| 9,262,788 | B1 | 2/2016 | Freeman et al. |
| 9,262,789 | B1 | 2/2016 | Tofte |
| 9,292,630 | B1 | 3/2016 | Freeman et al. |
| 9,311,271 | B2 | 4/2016 | Wright |
| 9,336,552 | B1 | 5/2016 | Freeman et al. |
| 9,633,146 | B2 | 4/2017 | Plummer et al. |
| 9,633,487 | B2 | 4/2017 | Wright |
| 9,707,911 | B1 | 7/2017 | Myers et al. |
| 9,855,919 | B1 | 1/2018 | Basir et al. |
| 10,192,369 | B2 | 1/2019 | Wright |
| 10,198,879 | B2 | 2/2019 | Wright |
| 10,540,723 | B1 | 1/2020 | Potter et al. |
| 10,664,917 | B1 | 5/2020 | Wasserman |
| 11,119,480 | B2* | 9/2021 | Potnis ................... B60W 50/00 |
| 2002/0030142 | A1 | 3/2002 | James |
| 2002/0055861 | A1 | 5/2002 | King et al. |
| 2002/0060267 | A1 | 5/2002 | Yavnai |
| 2003/0067461 | A1 | 4/2003 | Fletcher et al. |
| 2003/0154111 | A1 | 8/2003 | Dutra et al. |
| 2003/0200123 | A1 | 10/2003 | Burge et al. |
| 2003/0212478 | A1 | 11/2003 | Rios |
| 2005/0007633 | A1 | 1/2005 | Kadowaki |
| 2005/0108065 | A1 | 5/2005 | Dorfstatter |
| 2005/0144189 | A1 | 6/2005 | Edwards et al. |
| 2005/0165517 | A1 | 7/2005 | Reich |
| 2005/0276401 | A1 | 12/2005 | Madill et al. |
| 2006/0031103 | A1 | 2/2006 | Henry |
| 2007/0050360 | A1 | 3/2007 | Hull et al. |
| 2007/0179868 | A1 | 8/2007 | Bozym |
| 2008/0174789 | A1 | 7/2008 | Uffenkamp et al. |
| 2009/0028003 | A1 | 1/2009 | Behm et al. |
| 2009/0055226 | A1 | 2/2009 | Tritz et al. |
| 2009/0119132 | A1 | 5/2009 | Bolano et al. |
| 2009/0138290 | A1 | 5/2009 | Holden |
| 2009/0148068 | A1 | 6/2009 | Woodbeck |
| 2009/0265193 | A1 | 10/2009 | Collins et al. |
| 2010/0087987 | A1* | 4/2010 | Huang ................... B60W 40/08 701/49 |
| 2010/0094664 | A1 | 4/2010 | Bush et al. |
| 2010/0104191 | A1 | 4/2010 | McGwire |
| 2010/0111370 | A1 | 5/2010 | Black et al. |
| 2010/0161155 | A1 | 6/2010 | Simeray |
| 2010/0228406 | A1 | 9/2010 | Hamke et al. |
| 2010/0231692 | A1 | 9/2010 | Perlman et al. |
| 2010/0292871 | A1 | 11/2010 | Schultz et al. |
| 2010/0302359 | A1 | 12/2010 | Adams et al. |
| 2011/0049290 | A1 | 3/2011 | Seydoux et al. |
| 2011/0187713 | A1 | 8/2011 | Pershing et al. |
| 2011/0302091 | A1 | 12/2011 | Hornedo |
| 2012/0004793 | A1 | 1/2012 | Block |
| 2012/0013617 | A1 | 1/2012 | Zhang et al. |
| 2012/0076437 | A1 | 3/2012 | King |
| 2012/0179431 | A1 | 7/2012 | Labrie et al. |
| 2012/0303179 | A1 | 11/2012 | Schempf |
| 2013/0051639 | A1 | 2/2013 | Woodford et al. |
| 2013/0233964 | A1 | 9/2013 | Woodworth et al. |
| 2013/0262153 | A1 | 10/2013 | Collins et al. |
| 2013/0321393 | A1 | 12/2013 | Winder |
| 2014/0163775 | A1 | 6/2014 | Metzler |
| 2014/0168420 | A1 | 6/2014 | Naderhirn et al. |
| 2014/0180727 | A1* | 6/2014 | Freiberger ............. G06Q 40/08 705/4 |
| 2014/0226182 | A1 | 8/2014 | Lee et al. |
| 2014/0245165 | A1 | 8/2014 | Battcher et al. |
| 2014/0266623 | A1* | 9/2014 | Graumann ........... B60K 28/066 340/10.1 |
| 2014/0278587 | A1 | 9/2014 | Plummer et al. |
| 2014/0297065 | A1 | 10/2014 | Tofte et al. |
| 2014/0324483 | A1 | 10/2014 | Plummer et al. |
| 2015/0035666 | A1* | 2/2015 | Scofield ............... G08G 1/0112 340/439 |
| 2015/0046060 | A1* | 2/2015 | Nikovski .............. B60R 16/037 701/99 |
| 2017/0115952 | A1* | 4/2017 | Gregory .................... G06F 3/16 |
| 2017/0369072 | A1* | 12/2017 | Huber .................... B60W 30/09 |
| 2018/0012092 | A1* | 1/2018 | Gleeson-May ........ G06V 10/95 |
| 2018/0304771 | A1* | 10/2018 | Wolf .................... B60N 2/0276 |
| 2019/0101914 | A1 | 4/2019 | Coleman, II et al. |
| 2020/0070758 | A1* | 3/2020 | Cockings .............. B60R 16/037 |
| 2020/0180534 | A1* | 6/2020 | Köhler .................... G10L 17/04 |
| 2021/0146803 | A1* | 5/2021 | Wu ......................... B60N 2/002 |
| 2021/0179117 | A1* | 6/2021 | Glazman ............ B60H 1/00357 |
| 2021/0206346 | A1* | 7/2021 | Mukherjee .............. B60R 25/34 |
| 2021/0229674 | A1* | 7/2021 | Anikin .................. B60W 40/09 |
| 2021/0382586 | A1* | 12/2021 | Bielby .................. G06F 3/0482 |
| 2022/0032920 | A1* | 2/2022 | Varughese .............. H04W 4/40 |

OTHER PUBLICATIONS

Foo et al., Three-dimensional path planning of unmanned aerial vehicles using particle swarm optimization, Sep. 2006, AIAA.

Kluckner et al., Image based building classification and 3D modeling with super-pixels, ISPRS Technical Commission II Symposium, PCV 2010, vol. XXXVIII, part 3A, pp. 233-238 (Sep. 3, 2010).

Merz et al., Beyond Visual Range Obstacle Avoidance and Infrastructure Inspection by an Autonomous Helicopter, Sep. 2011, IEEE.

U.S. Appl. No. 13/647,098, Final Office Action, dated Nov. 1, 2013.
U.S. Appl. No. 13/647,098, Final Office Action, dated Oct. 9, 2014.
U.S. Appl. No. 13/647,098, Nonfinal Office Action, dated Apr. 26, 2013.
U.S. Appl. No. 13/647,098, Nonfinal Office Action, dated Mar. 14, 2014.

(56) References Cited

OTHER PUBLICATIONS

U.S. Appl. No. 13/647,098, Notice of Allowance, mailed Dec. 10, 2014.
U.S. Appl. No. 13/836,695, Final Office Action, dated Feb. 25, 2014.
U.S. Appl. No. 13/836,695, Nonfinal Office Action, dated Oct. 3, 2013.
U.S. Appl. No. 13/836,695, Notice of Allowance, dated Jun. 27, 2014.
U.S. Appl. No. 13/839,634, Final Office Action, dated Mar. 21, 2014.
U.S. Appl. No. 13/839,634, Nonfinal Office Action, dated Aug. 5, 2014.
U.S. Appl. No. 13/839,634, Nonfinal Office Action, dated Oct. 25, 2013.
U.S. Appl. No. 13/839,634, Notice of Allowance, dated Mar. 13, 2015.
U.S. Appl. No. 14/269,920, Final Office Action, dated Feb. 11, 2015.
U.S. Appl. No. 14/269,920, Nonfinal Office Action, dated Jul. 13, 2015.
U.S. Appl. No. 14/269,920, Nonfinal Office Action, dated Sep. 25, 2014.
U.S. Appl. No. 14/269,920, Notice of Allowance, dated Dec. 14, 2016.
U.S. Appl. No. 14/318,521, Nonfinal Office Action, dated Oct. 10, 2014.
U.S. Appl. No. 14/318,521, Notice of Allowance, dated Apr. 10, 2015.
U.S. Appl. No. 14/323,626, Final Office Action, dated Apr. 3, 2015.
U.S. Appl. No. 14/323,626, Nonfinal Office Action, dated Sep. 17, 2014.
U.S. Appl. No. 14/323,626, Notice of Allowance, dated Oct. 13, 2015.
U.S. Appl. No. 14/496,802, Final Office Action, dated May 4, 2015.
U.S. Appl. No. 14/496,802, Nonfinal Office Action, dated Jan. 2, 2015.
U.S. Appl. No. 14/496,802, Notice of Allowance, dated Oct. 2, 2015.
U.S. Appl. No. 14/496,840, Final Office Action, dated May 5, 2015.
U.S. Appl. No. 14/496,840, Nonfinal Office Action, dated Jan. 5, 2015.
U.S. Appl. No. 14/496,840, Notice of Allowance, dated Nov. 23, 2015.
U.S. Appl. No. 14/631,568, Final Office Action, dated Sep. 10, 2015.
U.S. Appl. No. 14/631,568, Nonfinal Office Action, dated May 19, 2015.
U.S. Appl. No. 14/631,568, Notice of Allowance, dated Jan. 7, 2016.
U.S. Appl. No. 14/656,185, Final Office Action, dated Jun. 25, 2015.
U.S. Appl. No. 14/656,185, Nonfinal Office Action, dated Apr. 2, 2015.
U.S. Appl. No. 14/656,185, Notice of Allowance, dated Oct. 9, 2015.
U.S. Appl. No. 14/820,328, Final Office Action, dated Feb. 17, 2016.
U.S. Appl. No. 14/820,328, Nonfinal Office Action, dated Sep. 24, 2015.
UTC Spotlight: Superstorm Sandy LiDAR Damage Assessment to Change Disaster Recovery, Feb. 2013.
Woodbeck et al., "Visual cortex on the GPU: Biologically inspired classifier and feature descriptor for rapid recognition," IEEE Computer Society Conference on Computer Vision and Pattern Recognition Workshops 2008, pp. 1-8 (2008).

* cited by examiner

TRAINING AND UTILIZING A MACHINE-LEARNING MODEL TO AUTOMATICALLY PREDICT AN IDENTITY OF A DRIVER BASED ON SEAT POSITION

TECHNICAL FIELD

The present disclosure generally relates to training a machine-learning model to automatically detect a driver's identity based on position or orientation data relevant to a vehicle cockpit, and, more particularly, to utilizing the machine-learning model to automatically detect a driver's identity and to activating personalized driver-based services particular to the identified driver.

BACKGROUND

Computers are increasingly integrated in vehicles and vehicle operation, and these computers grow more powerful and capable every year. For example, autonomous vehicles heavily rely on computer and sensor systems to control vehicle operation. Vehicle computers, or carputers, often collect data from various vehicle sensors, such as global positioning systems, speedometers, odometers, and body controllers. Further, vehicle computers are increasingly capable of integrating with other computer systems, giving users a connected and "intelligent" computing environment within the vehicle cabin. Many newer vehicles especially rely on vehicle computers and sensor systems-particularly vehicles autonomous driving, semi-autonomous driving, and other "intelligent" technology packages. While these vehicle computer systems enable more and better safety features over time, mobile devices simultaneously facilitate dangerous and distracted driving, such as internet browsing while driving, texting while driving, emailing while driving, and use of social media while driving.

SUMMARY

The described methods and systems enable automatic prediction or detection of a driver's identity based on an analysis of position or orientation data pertaining to elements of a cockpit that the driver tends to personalize according to her preferences when driving. Example position or orientation data may include data pertaining to seat or mirror position or orientation. Some of the disclosed embodiments utilize machine-learning techniques to train a machine-learning (ML) model to automatically detect or predict a driver's identity based on learned patterns (e.g., based on preferred positions or orientations the ML model has learned for the driver.) If desired, one or more embodiments may implement unsupervised learning techniques, supervised learning techniques, or both unsupervised and supervised learning techniques. In some instances, the ML model is trained to detect preferred position or orientation patterns for any of a number of drivers, enabling the ML model to detect each of those drivers when they enter the vehicle and adjust in-vehicle settings according to their preferences.

Note, this summary has been provided to introduce a selection of concepts further described below in the detailed description. As explained in the detailed description, certain embodiments may include features and advantages not described in this summary. Similarly, certain embodiments may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

DETAILED DESCRIPTION

Figure 1:
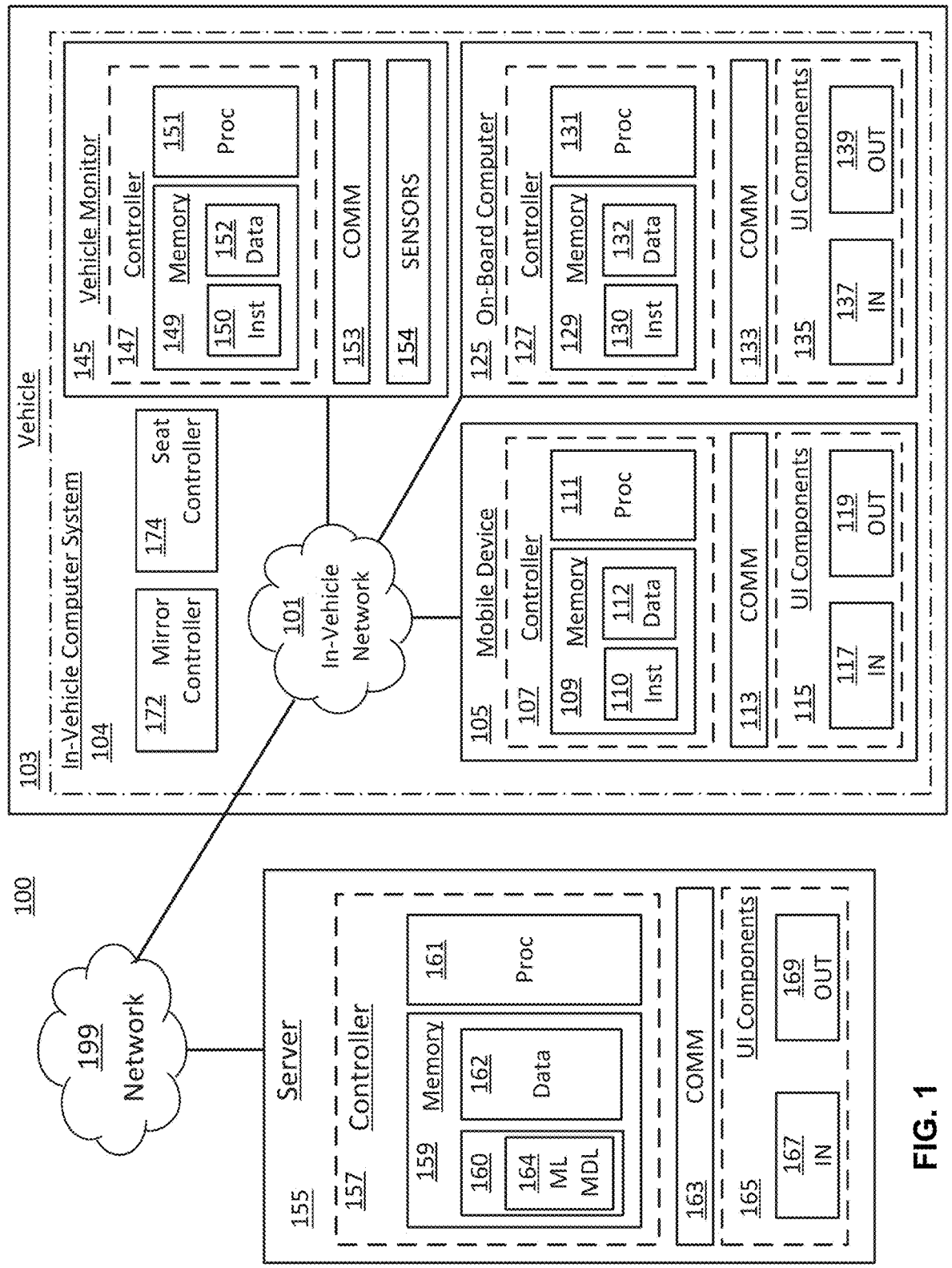
FIG. 1 is a block diagram of a system for automatically predicting driver identities and activating personalized driver-based services according to an embodiment.
Figure 2A:
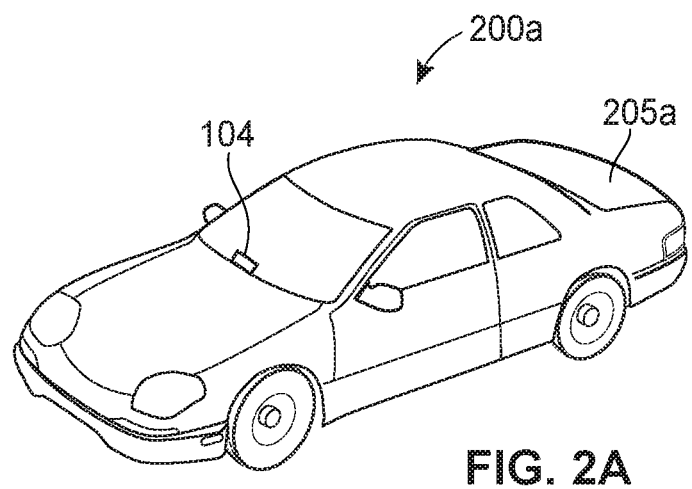
FIG. 2A depicts an example vehicle computer system for an automobile according to an embodiment.
Figure 2B:
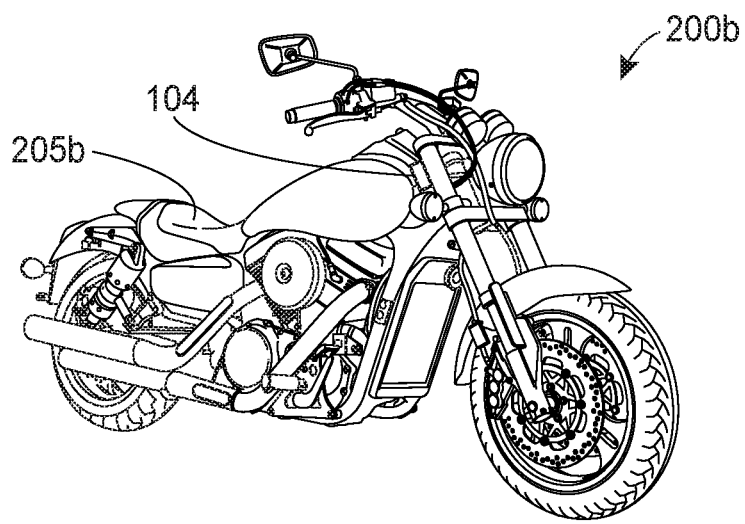
FIG. 2B depicts an example vehicle computer system for a motorcycle according to an embodiment.
Figure 2C:
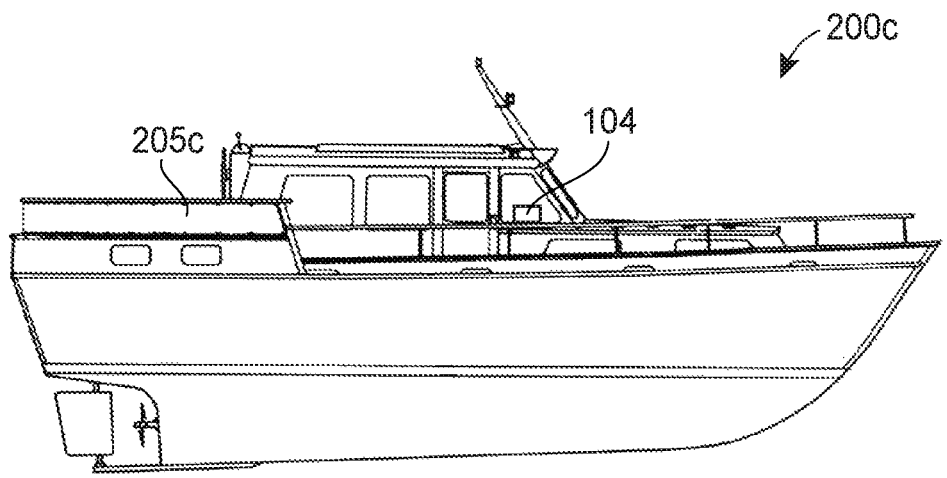
FIG. 2C depicts an example vehicle computer system for a watercraft according to an embodiment.
Figure 2D:
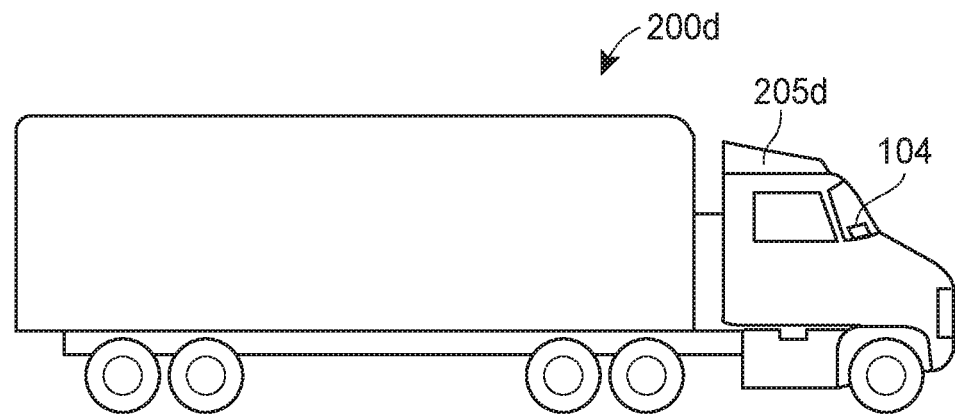
FIG. 2D depicts an example vehicle computer system for a commercial automobile according to an embodiment.
Figure 2E:
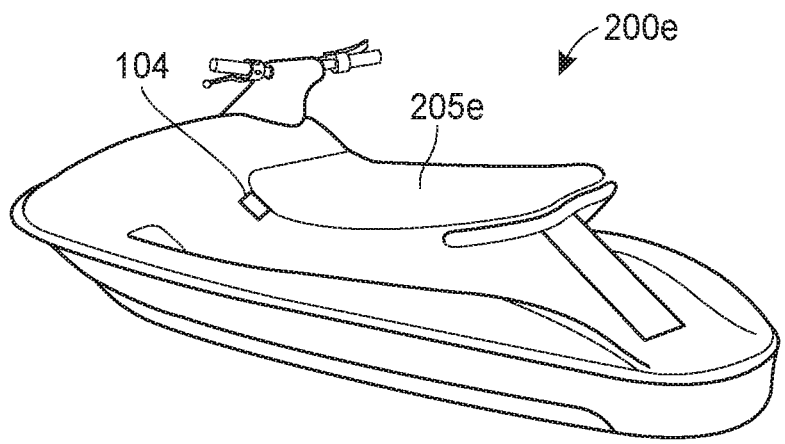
FIG. 2E depicts an example vehicle computer system for a personal watercraft according to an embodiment.
Figure 2F:
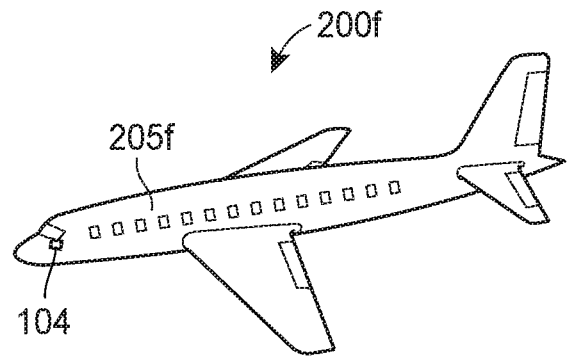
FIG. 2F depicts an example vehicle computer system for an aircraft according to an embodiment.
Figure 2G:
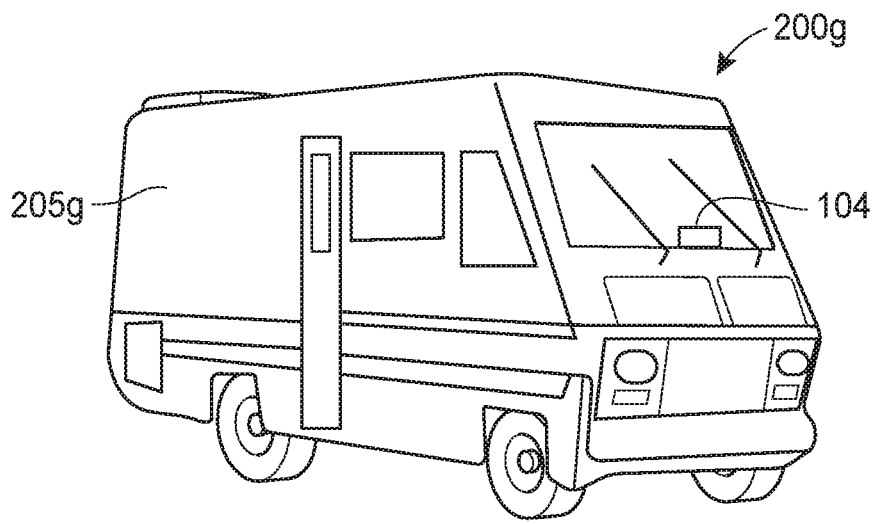
FIG. 2G depicts an example vehicle computer system for a recreational vehicle according to an embodiment.
Figure 2H:
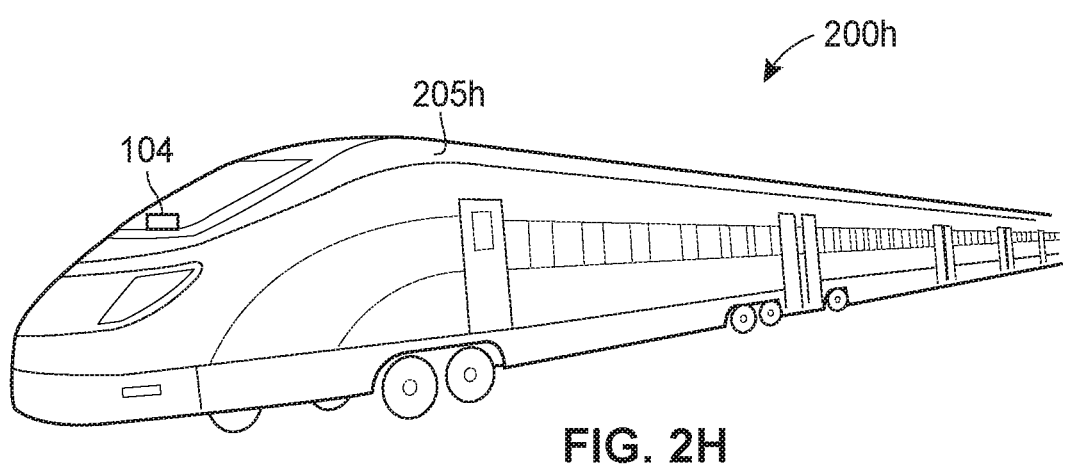
FIG. 2H depicts an example vehicle computer system for a train according to an embodiment.
Figure 2I:
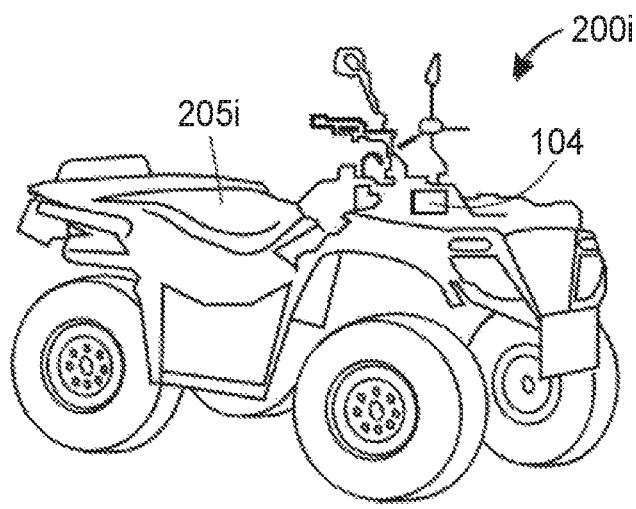
FIG. 2I depicts an example vehicle computer system for a four-wheeler according to an embodiment.
Figure 3:
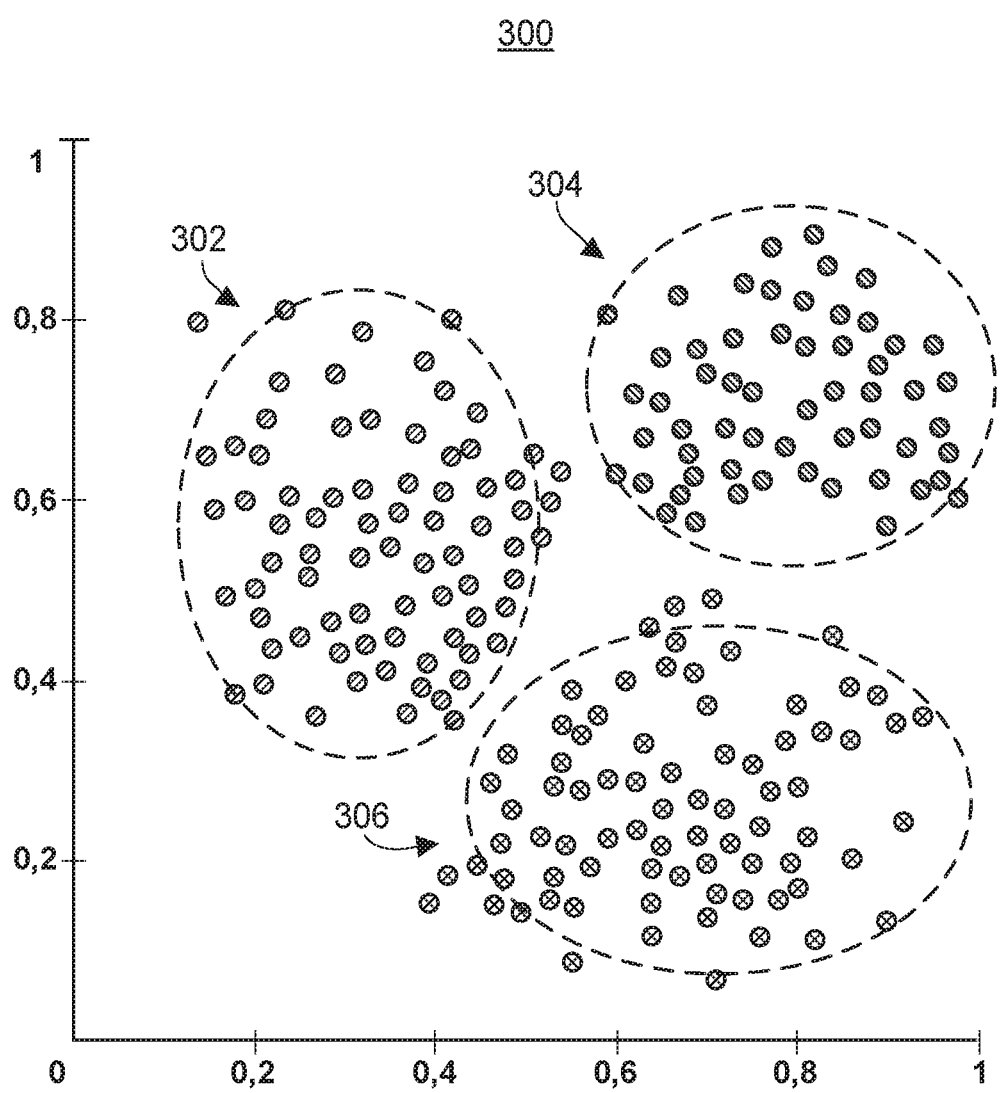
FIG. 3 depicts a set of example clusters of position or orientation data according to an embodiment.
Figure 4:
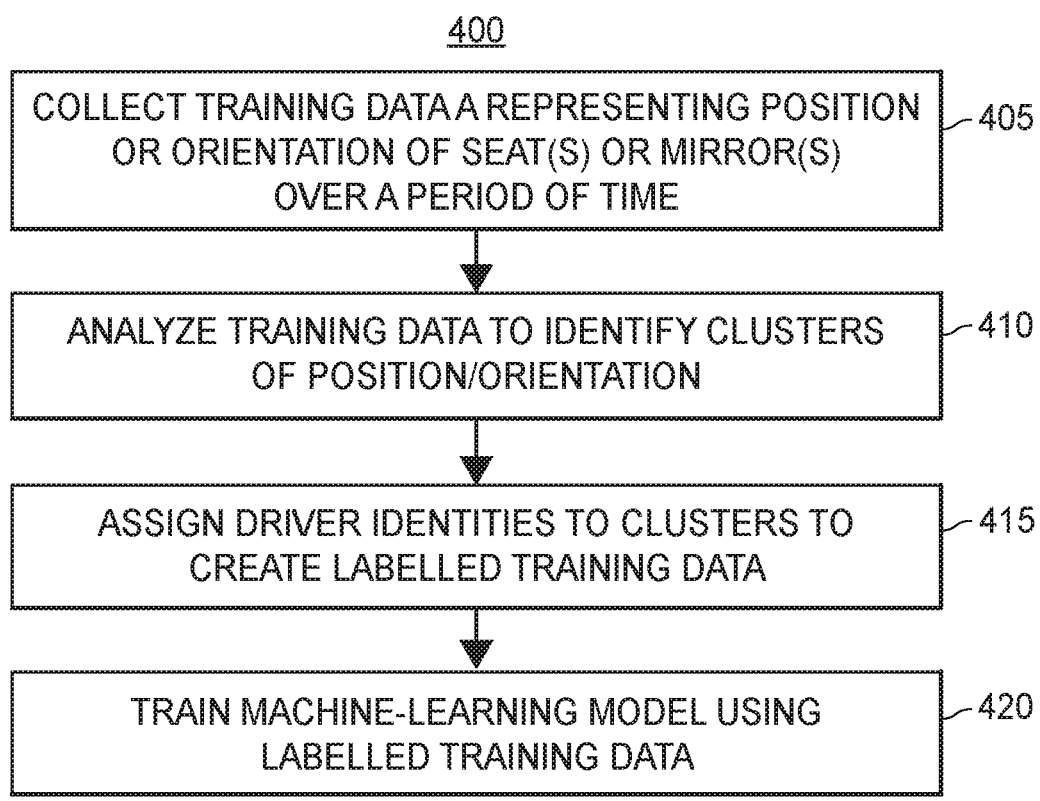
FIG. 4 depicts an example method for collecting training data and implementing unsupervised learning techniques to identify clusters of position or orientation data, according to an embodiment.
Figure 5:
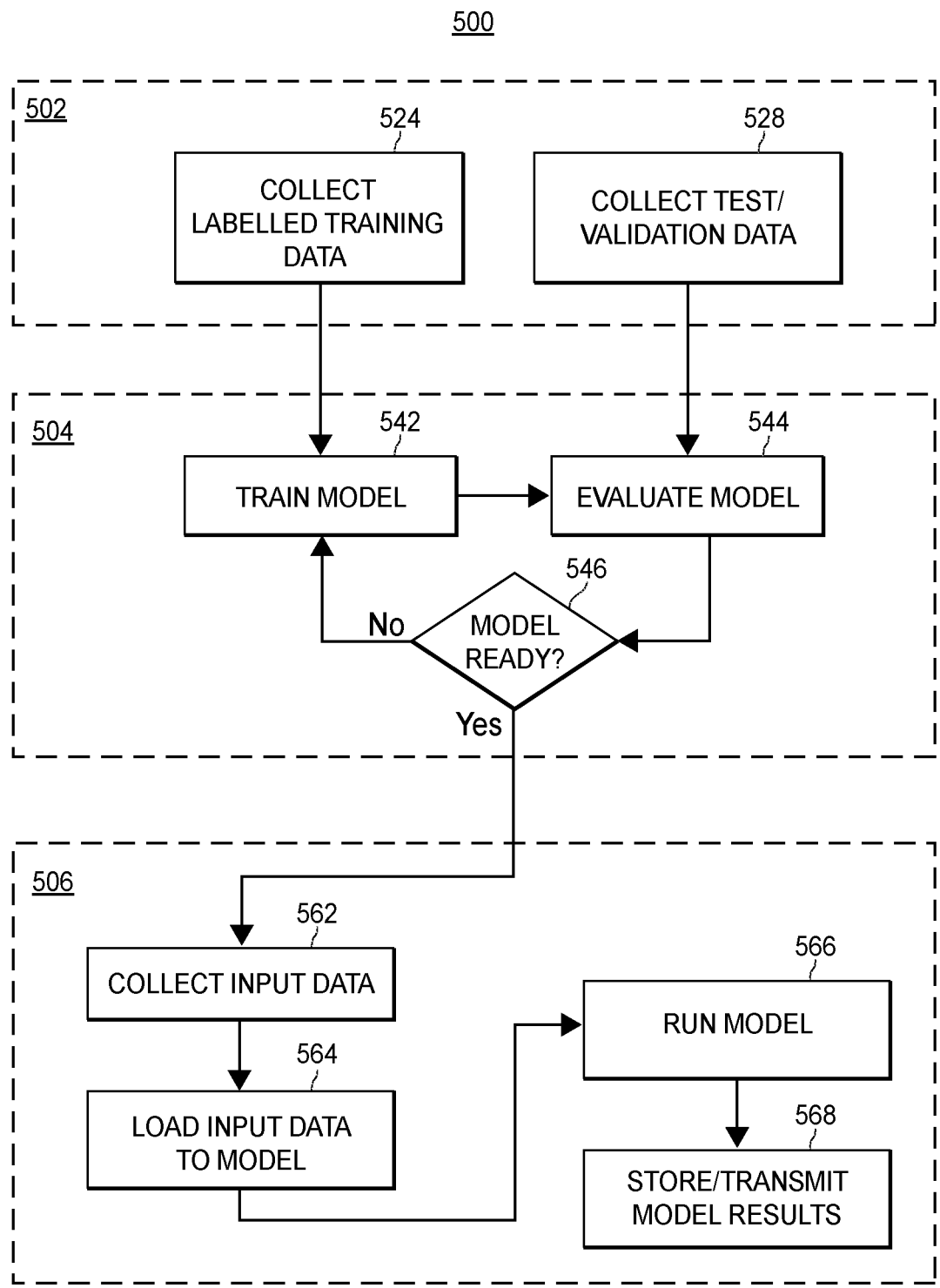
FIG. 5 depicts an example method for training, evaluating, and utilizing a ML model for predicting a driver identity based on data, acquired via one or more sensor systems, representing position(s) or orientation(s), according to an embodiment.
Figure 6:
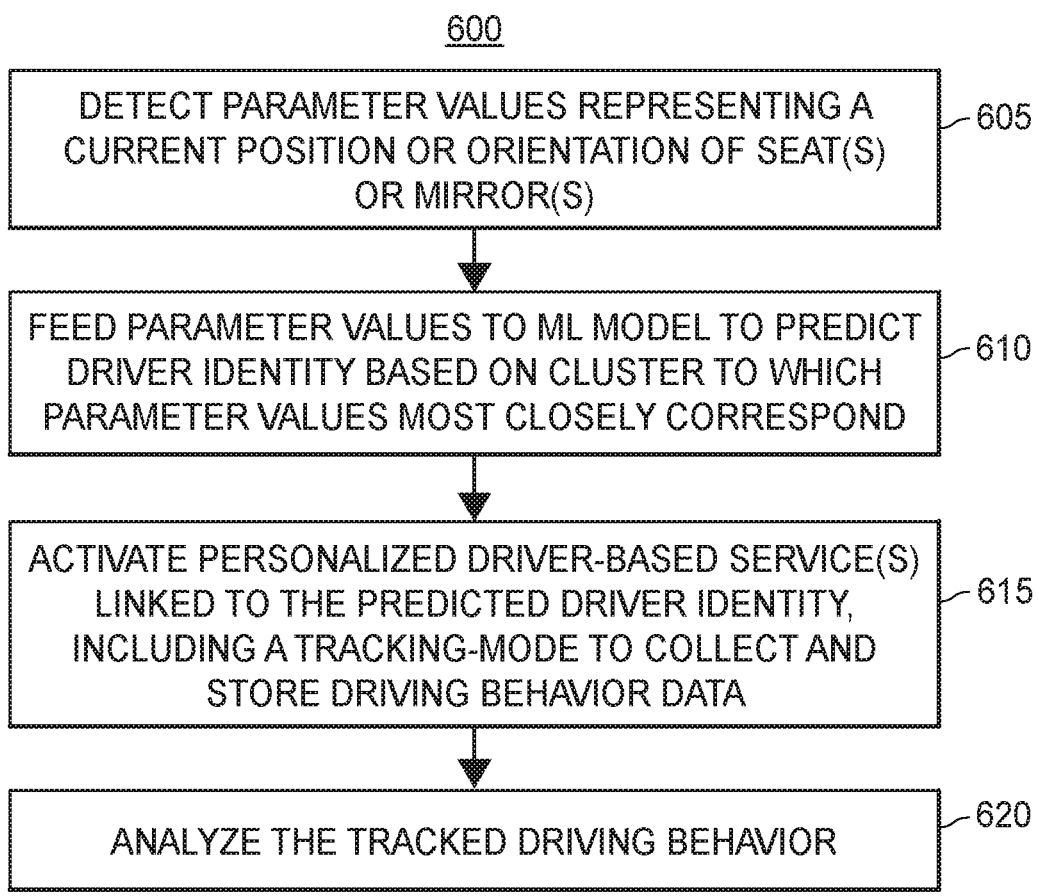
FIG. 6 depicts an example method for implementing a ML model to predict a driver identity, according to an embodiment.
Figure 7:
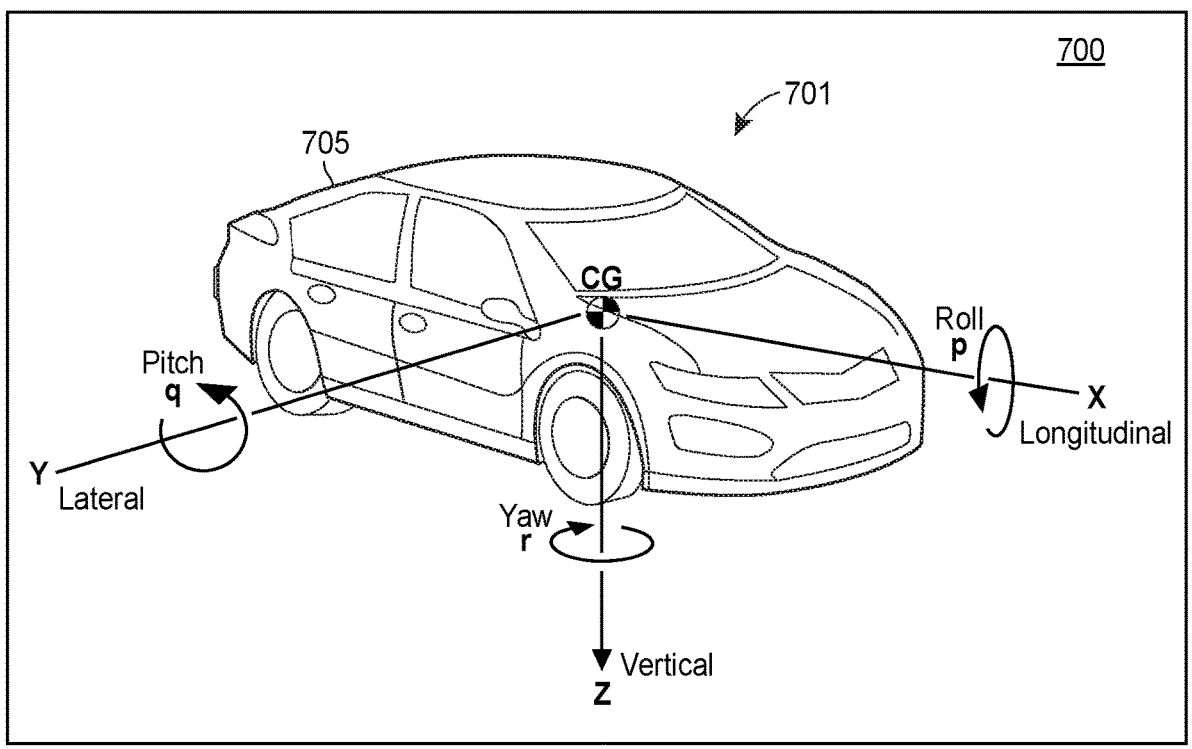
FIG. 7 depicts an example vehicle environment, including a vehicle and an example coordinate system, according to an embodiment.
Figure 8:
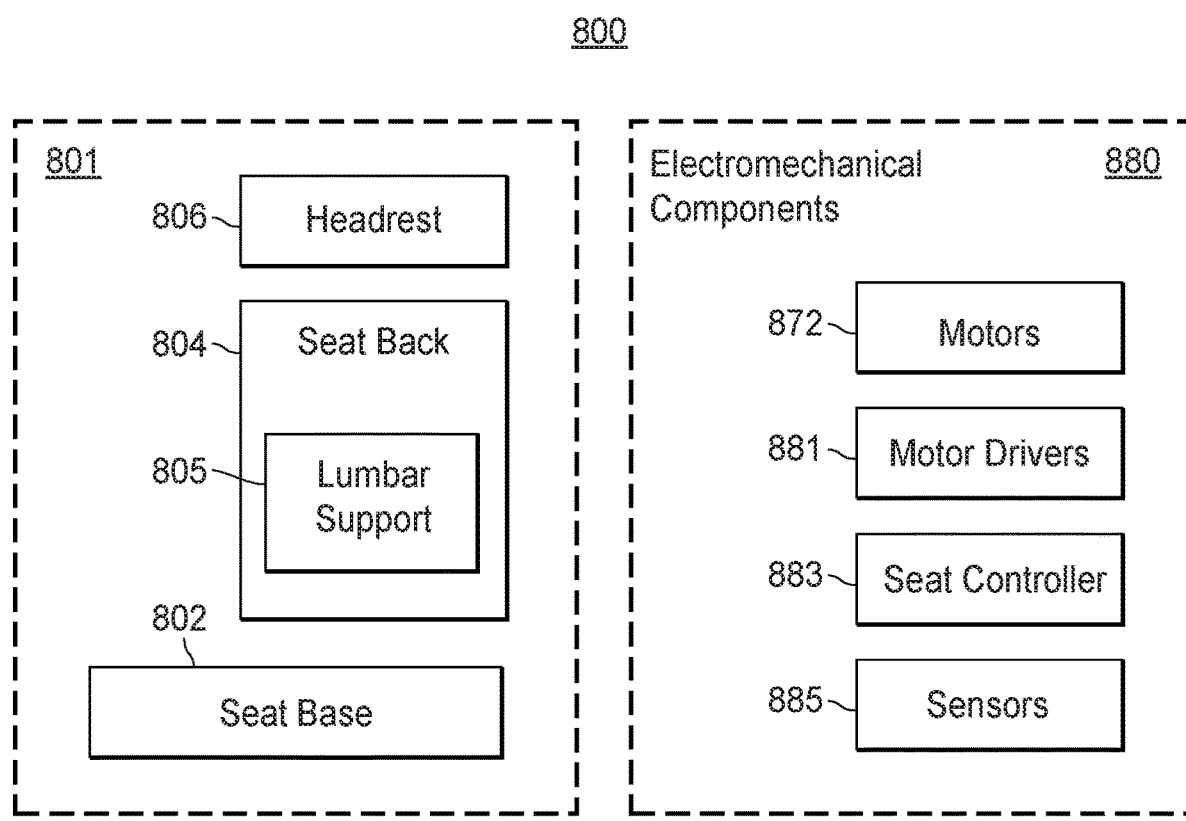
FIG. 8 depicts an example vehicle environment including a driver seat and a set of electromechanical components for the driver seat, according to an embodiment.
Figure 9:
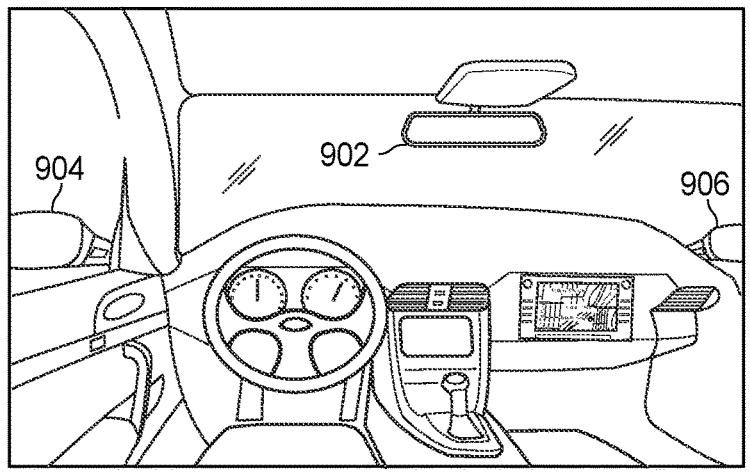
FIG. 9 depicts an example vehicle environment including a rearview mirror, a driver sideview mirror, a passenger sideview mirror, and a set of electromechanical components for the mirrors, according to an embodiment.

Various techniques, systems, and methods are discussed below with reference to FIGS. 1-9. FIGS. 1-2J depict example systems and system components according to one or more embodiments; FIG. 3 depicts an example graph showing clusters of sets of parameter values according to one or more embodiments; FIGS. 4-6 depict example methods that may be implemented via one or more of the systems shown in FIGS. 1-2J; and FIGS. 7-9 depict example vehicle environments in which the disclosed techniques and systems may be implemented.

Specifically, the following is described: (I) an example vehicle computer system 100 (shown in FIG. 1), configured to automatically detect a driver identity of a driver driving a vehicle 103 and activate personalized driver-based services; (II) example vehicles 200 (shown in FIGS. 2A-2I) that may be utilized in the system 100 in place of or in addition to the vehicle 103; (III) an example graph 300 showing clusters of sets of parameter values that may be detected and analyzed by the system 100 (FIG. 3); (IV) example methods 400-600 that may be implemented by the system 100 (FIGS. 4-6); (V) example vehicle environments 700-900 in which the system 100 and any one or more of the methods 400-600 may be implemented (FIGS. 7-9); (V) additional considerations; and (VI) general terms and phrases.

In an embodiment, the system 100 acquires multiple sets of parameter values, wherein each set of parameter values: (i) corresponds to a different one of a plurality of driving sessions and (ii) includes one or more values representing an orientation or position relevant to a cockpit of the vehicle 103 (e.g., an orientation or position of a driver's seat, steering wheel, or mirror, such as a rearview mirror or sideview mirror).

As used herein, unless noted otherwise, the phrase "position or orientation data" and variations thereof refer to data that includes parameter values representing a measured, detected, or estimated position (e.g., of a seat, steering wheel, or mirror), a measured or estimated orientation (e.g., of a seat, steering wheel, or mirror), or some combination thereof. Generally speaking, each parameter value representing a measured or detected position or orientation for a particular component (e.g., a component of a seat or mirror) is one of six possible measurements reflecting a position or orientation in three-dimensional space: forward/backward position, up/down position, left/right position, x-axis rotation, y-axis rotation, or z-axis rotation. In some instances, each parameter in the "position or orientation data" may be referred to as a six degree of freedom ("6DOF") parameter or measurement. Note, in some embodiments, not every single seat component or mirror component will be movable in all 6DOF. Some may only be movable in one or more dimensions, and some components may not be movable at all. As an example, in some cars, a driver seat base may only be repositionable longitudinally (e.g., forward backward) and may only be rotatable around the lateral axis (e.g., to drop or raise the front of the seat base relative to the back of the seat base). Nevertheless, the longitudinal measurement of such a driver seat may be thought of as an example 6DOF parameter because it indicates a measurement of position or orientation in 3D space (even though the seat base is not movable in all six degrees of freedom).

As used herein, the term "cockpit" generally refers to the area or portion of a vehicle in which the control instruments are accessible to a driver or pilot (herein simply "driver") to thereby enable the driver to control physical movement of the vehicle (e.g., enabling the driver to drive, fly, steer, or otherwise control the vehicle). The cockpit may include instruments for not only controlling physical movement of the vehicle, but also any one or more of: (i) instruments for controlling the position or orientation of various components in the cockpit (e.g., instruments for adjusting the positions or orientations of seats, mirrors, steering wheels, pedals, heads-up projectors, etc.), (ii) instruments for controlling media provided in the cockpit (e.g., audio, video, etc.); (iii) instruments for controlling environmental settings (e.g., general air conditioning control, general heat control, controls for seat heating or cooling, etc.); etc.

In any event, the system 100 may implement a training operation based on the multiple sets of parameter values representing position or orientation information (e.g., seat or mirror position or orientation). The training operation may include the system 100 identifying or detecting clusters of sets within the multiple sets (e.g., see the clusters shown in FIG. 3), assigning a driver identity to each cluster (e.g., Alice, Bob, Charlie, etc.), and training a machine-learning (ML) model using the sets and corresponding driver identities with which the sets have been labeled. The system 100 may implement the ML model to analyze subsequently collected (e.g., in real-time) sets of parameters values (e.g., from the vehicle 103) and predict a driver identity based on which cluster the collected sets of parameter values most closely corresponds. In response to predicting the driver's identity, the system 100 may activate a personalized driver-based service. For example, the system 100 may activate a tracking-mode particular to the predicted driver identity, thereby activating the collection and storing of driving behavior data such that the driving behavior data is linked to the predicted driver identity and referenceable to analyze driving behavior particular to the current driver.

Advantageously, by automatically detecting or predicting a driver, the system 100 can modify other settings or preferences according to a driver's preference, such as settings pertaining to radio station, thermostat, driving mode (e.g., economy, sport, regular, 4×4, etc.), suspension (e.g., stiffer for improved handling, softer for improved comfort), interior lighting, autonomous or semi-autonomous features, safety features (e.g., driver notification settings regarding lane deviation, nearby vehicles, desired proximity during adaptive cruise control, etc.), and any other desired setting.

In some embodiments, the system 100 may utilize the driver's profile (e.g., including parameters representing driver tendencies regarding acceleration, lane deviation, braking patterns, traffic violations, etc.) when communicating with networked vehicles on the road to alert other drivers of the driver's type (i.e., the type of the driver of the vehicle 103) or to allow autonomous or semi-autonomous systems of the other vehicles to account for the driver's tendencies.

In some embodiments, the driver may opt-in to a driver-based insurance program (e.g., rather than a vehicle-based insurance program), and the system 100 may track the driver while he or she is driving and "activate" her insurance while she is driving, regardless of the car she is driving. That is, the insurance policy may "follow" the driver to cover her regardless of the vehicle he or she is driving, enabling a driver to obtain a single driver-based policy that will cover her for any of a number of cars she may drive.

Similarly, in some embodiments, the system 100 may operate to enable a driver's preferences to "follow" her to any of a number of vehicles she chooses to drive. As an example, if a person or family owns three cars, the system 100 may operate to enable any one or more of the previously described preferences to be "set" when the driver enters the cockpit of any of the three cars, adjusts her seat or mirror position or orientation, and is recognized by one of the systems disclosed herein. In this sense, one or more aspects of the system 100 may be thought of as a control system for accurately personalizing a driver's environment, regardless of the vehicle he or she is driving.

Similarly, in some embodiments, a driver's preferences may "follow" her to any of a number of vehicles she chooses to drive. As an example, if a person or family owns three cars, any one or more of the previously described preferences may be "set" when the driver gets in the cockpit of any of the three cars, adjusts her seat or mirror position or orientation, and is recognized by one of the systems disclosed herein.

In some embodiments, the system 100 may detect a driver without using a specialized device that is "assigned" to a driver, such as a key fob. Thus, when a first driver drives with a second driver's keys and key fob, the first driver may avoid being misidentified as the second driver. Similarly, the first driver can avoid the second driver being misidentified as the first driver (thus potentially avoiding the second driver adjusting the first driver's settings, having the second driver's behaviors attributed to herself, etc.). If desired, in addition to utilizing an analysis of position or orientation data to detect a driver identity, the disclosed systems may also utilize specialized devices that are "assigned" to a user, such as a key fob. In such systems, the position and orientation data can be used to prevent the a "false identification" that might otherwise occur if relying solely on key fob. In any event, due to the fact that family members often use each other's keys and key fobs, the techniques disclosed herein offer advantages even for households in which family members are "assigned" key fobs that are theoretically uniquely identifiable.

I. Example Vehicle Computer System 100

FIG. 1 is a block diagram of the example system 100 for automatically detecting driver identities and activating personalized driver-based services particular to driver identities. The system 100 may include any one or more of: a network 199, the vehicle 103 (which may be coupled to the network 199), and a server 155 that may be coupled to the network 199. The vehicle 103 may include an in-vehicle computer system 104, which may include a mobile device 105, an on-board computer 125, a vehicle monitor 145, a mirror controller 172, or a seat controller 174.

A. Example Operation of the System 100

In an embodiment, the system 100 is configured to perform any one or more of the following operations: (i) detect parameter values relating to position or orientation data relating to components in the cockpit of the vehicle 103, (ii) implement a training operation to train an ML model based on the parameter values, (iii) detect or predict a driver's identity based on detected position or orientation data via the ML model after it has been sufficiently trained, or (iv) activate a personalized driver-based services particular to the detected driver, such as driver tracking.

When implementing the training operation, the system 100 detects parameter values over a given time period in which multiple driving sessions may occur with respect to the vehicle 103 (e.g., wherein a driving session constitutes a period between which a driver activates the vehicle 103, causes the vehicle 103 to move, and then deactivates or shuts off the vehicle 103). As an example, the parameter values may represent a position or orientation of a driver's seat of the vehicle 103 when the driver starts the vehicle 103 or when the vehicle 103 begins moving (the latter may be advantageous for drivers who adjust their seat after starting the car).

Each "set of parameter values" may correspond to a single driving session (e.g., such that a first set corresponds to a first driving session, a second set to a second session, a third set to a third driving session, etc.). Further, each "set of parameter values" may include a single parameter value or multiple parameters values (e.g., representing any one or more positions along any of the three spatial axes or tilt/rotation around any one of the three axes).

In any event, the system 100 may detect and store relevant sets for any desired number driving sessions, during which multiple different drivers may drive the vehicle 103. Then, the system 100 may identify distinct clusters of sets. For example, the system 100 may analyze the collected sets of parameter values to determine that three distinct clusters exist (e.g., three relatively distinct seat positions/orientations due to different driver sizes and preferences). The system 100 may label the sets within each of these clusters with driver identities such that each set within a cluster shares the same driver identity. The system 100 may use this labeled data to train a ML model. Subsequently, the system 100 may implement the ML model to acquire a current set of parameter values, predict a driver identity based on the current set, and activate a tracking-mode particular to the predicted driver to collect and store driving behavior data such that the driving behavior data is linked to the predicted driver identity and referenceable to analyze driving behavior particular to the current driver B. Example Components of the System 100

The network 199 may be any suitable network and may include one or more nodes, links, or subnetworks (e.g., personal area networks, local area networks, wide area networks). The network 199 may include wireless or wired links or subnetworks. The network 199 may be a proprietary network, a secure public internet, a virtual private network or some other type of network, such as dedicated access lines, plain ordinary telephone lines, satellite links, combinations of these, etc.

The vehicle 103 may be any suitable vehicle (e.g., an automobile, a motorcycle, an engineering or heavy-duty vehicle such as a tractor or steamroller, etc.). The vehicle 103 may include the in-vehicle computer system 104, which may include an in-vehicle network 101. Like the network 199, the network 101 may be any suitable network and may include one or more nodes, links, or subnetworks (e.g., personal area networks, local area networks, wide area networks). The network 101 may include wireless or wired links or subnetworks. The in-vehicle system 104 may include a mobile device 105, an on-board computer 125, a vehicle monitor device 145, a mirror controller 172, or a seat controller 174, any one of which may be coupled to the network 101 via a wired or wireless link.

In some embodiments, any one or more of the systems 105, 125, 145, 155, 172, and 174 may communicate with any other of the systems 105-174 (or with any other suitable device or system not shown) via messages conforming to any suitable communication protocol (examples of which are described in the "Additional Considerations" section). When the network 199 includes or connects to the internet, data communications may take place over the network 199 via one or more protocols from the Internet Protocol ("IP") suite (e.g., TCP/IP). Thus, messaging between the server 155 and any one or more of the mobile device 105, the OBC 125, the vehicle monitor 145, the mirror controller 172, or the seat controller 174 may conform with any one or more of these IP suite protocols.

1. The Mobile Device 105

Generally speaking, the mobile device 105 is a portable computer system associated with a user (e.g., a driver or passenger of the vehicle 103), such as a tablet, a mobile phone, a laptop, or a wearable device (e.g., a smart watch, smart glasses, etc.). The mobile device 105 may include a controller 107 (e.g., including a memory 109 and a processor 111), a communication interface 113, and a set of UI components 115 including an electronic display device 119 and one or more touch sensors 117 (e.g., integrated into the display device 119). The display device 119 may be any suitable display and may include a screen, a projector, a heads-up interface, etc. The mobile device 105 may include additional or alternative UI components 115, including various input components 117 (e.g., electro-mechanical buttons or keys, a mouse, audio sensors or microphones, image sensors, motion sensors, etc.) or one or more output components 119 (e.g., an audio output such as a speaker, a motion generating component such as haptic motor for haptic feedback, etc.).

The memory 109 may include (i) a set of instructions 110 that, when implemented by the processor 111, cause the processor 111 to perform one or more operations describe herein with respect to the mobile device 105, and (ii) data 112 (e.g., including input data on which the processor 111 may operate or output data generated by the processor 111). In example operation, the mobile device 105 enables functionality typically associated with tablets or mobile phones, such as web browsing, emailing, texting, data messaging, social media use, phone calling, etc.

2. The OBC 125

The on-board computer (OBC) 125 is a computer system disposed within and, if desired, integrated into, one or more components of the vehicle 103 (e.g., including a display on a dash of the vehicle). The OBC 125 may be permanently or temporarily installed in the vehicle 103, and may be referred to as a "carputer" if desired.

The OBC 125 may include a controller 127 (e.g., including a memory 129 and a processor 131), a communication interface 133, and a set of UI components 135 including an electronic display device 139 and one or more touch sensors 137 (e.g., integrated into the display device 139). The display device 139 may be any suitable display and may include a screen, a projector, a heads-up interface, etc. In an embodiment, the display 139 is integrated into a dash, console, or seat of the vehicle 103. The display 139 may include a screen facing one or more of the seats of the vehicle or may including a projector to project images onto a windshield or other surface visible to the driver or passengers (e.g., a projection surface near the top or near the bottom of the windshield). As another example, the display 139 may not be integrated into the dash or other components of the vehicle 103. For example, the display 139 may be temporarily mounted or installed to a vent, windshield, or some other component of the vehicle 103.

In any event, the OBC 125 may include additional or alternative UI components 135, including various input components 137 (e.g., electro-mechanical buttons or keys, a mouse, audio sensors or microphones, image sensors, motion sensors, etc.) or one or more output components 139 (e.g., an audio output such as a speaker, a motion generating component such as haptic motor for haptic feedback, etc.).

The memory 129 may include (i) a set of instructions 130 that, when implemented by the processor 131, cause the processor 131 to perform one or more operations described herein with respect to the OBC 125, or (ii) data 132 (e.g., including input data on which the processor 131 may operate or output data generated by the processor 131).

In an embodiment, the OBC 125 communicates with the mirror controller 172 or the seat controller 174 via any suitable wired or wireless link. In some embodiments, the mirror controller 172 or the seat controller 174 may be a component of the OBC 125. Specifically, the OBC 125 may transmit commands to the mirror controller 172 or the seat controller 174 to adjust the position or orientation of a driver seat or a mirror in the vehicle 103 (e.g., in response to the driver manipulating a switch or button in the cockpit for adjusting the mirror). Similarly, the mirror controller 172 or the seat controller 174 may transmit positions or orientations of mirrors or seat positions to the OBC 125. Such transmission may occur in response to a request from the OBC 125, or may occur in response to a change of position or orientation (e.g., an update may be transmitted when changes occur), or may occur on a regular or periodic basis.

In an embodiment, the OBC 125 includes or is otherwise communicatively coupled to a sensor system (e.g., typical motion/position sensors, or sensors integrated with a system associated with the mirror controller 172 or seat controller 174) that is installed or otherwise disposed in the vehicle 103 (e.g., via a wired or wireless link). For example, such a sensor system may include a speedometer; an accelerometer; one or more cameras, image sensors, laser sensors, RADAR sensors, or infrared sensors directed to the road surface or to potential obstacles on the road (e.g., for autonomous or semi-autonomous driving); a dedicated GPS receiver (not shown) disposed in the vehicle (e.g., in the interior, such as in the cabin, trunk, or engine compartment, or on the exterior of the vehicle); a compass; one or more sensors for detecting a position or orientation of a seat component, one or more sensors for detecting a position or orientation of a mirror, etc. The controller 127 may communicate with and rely on data from the sensor system to facilitate generating notifications for the user, controlling the vehicle 103 in an autonomous or semi-autonomous fashion, etc.

3. The Vehicle Monitor Device 145

The vehicle monitor device 145 is a computer system that may include a controller 147 (e.g., including a memory 149 and a processor 151), a communication interface 153, and a set of sensors 154. While not shown, the vehicle monitor 145 may include UI components similar to the UI components 115 and 135 in some embodiments. In some instances, the vehicle monitor 145 may be a specialized add-on device that is installed to enable tracking of driving behavior for a usage-based insurance (UBI) policy to which the driver or vehicle owner has opted-in.

In some instances, the vehicle monitor 145 is activated by the system 100 in response to detecting or predicting a particular driver identity. As an example, two drivers in a household may each have a driver-based insurance policy. When a first driver enters the car and sets the seat or mirror in a particular position or orientation, the system 100 may "predict" that the first driver is the driver, and may activate the vehicle monitor 145 to track the first driver's behavior as part of a usage-based insurance program in which the driver may be rewarded (e.g., with lower premiums, cashback bonuses, etc.) for engaging in safer driving behaviors (e.g., driving in a manner consistent with speed limits, driving more often in well-lit and highly visible areas, avoiding driving in dangerous weather, etc.). In a typical example, participating drivers opt-in to such a program to take advantage of the incentives associated with safe driving.

The sensors 154 are configured to collect data to enable tracking of the behavior of the vehicle 103 (e.g., braking, accelerating/decelerating, swerving, proximity to other vehicles, adherence to lane markers and other road markers, adherence to speed limits, etc.) or of the driver specifically and distinct from observations of the vehicle (e.g., head pose or eye gaze direction indicating attention to the road, hand placement, etc.). The sensors 154 may include a speedometer; an accelerometer; one or more cameras, image sensors, laser sensors, RADAR sensors, or infrared sensors directed to the road surface, to potential obstacles on the road, or to the driver (e.g., for autonomous or semi-autonomous driving); a dedicated GPS receiver (not shown) disposed in the vehicle (e.g., in the interior, such as in the cabin, trunk, or engine compartment, or on the exterior of the vehicle); a compass; etc.

The memory 149 may include (i) a set of instructions 150 that, when implemented by the processor 151, cause the processor 151 to perform one or more operations described herein regarding vehicle monitor 145, or (ii) data 152 (e.g., including input data on which the processor 151 may operate or output data generated by the processor 151).

In example operation, the controller 147 receives an activation command (e.g., via an input component or via the communication interface 153). The activation command may originate at any of the server 155, the mobile device 105, or the OBC 125. In response to receiving the command, the controller 147 collects, via the sensors 154, data representing vehicle behavior or driver behavior. The controller 147 may transmit the data to the server 155 for analysis (e.g., to identify the behavior and a corresponding risk profile adjustment if necessary). In some embodiments, the data may be transmitted to the OBC 125 or the mobile device 105 for analysis. In an embodiment, the controller 147 performs the analysis.

The controller 147 may receive a deactivation command via an input component or via the communication interface 153. Again, this command may originate at any of the server 155, the mobile device 105, or the OBC 125. In response to receiving the deactivation command, the controller 147 stops collecting data via the sensors 154. In an embodiment, the controller 147 responds to the deactivation command by stopping the reporting of collected data for analysis, but continues to collect data via the sensors 154. The data may be stored locally to the memory 149 in such an embodiment. If desired, a user may have control over the collected data (e.g., he or she may have control over whether or not the data is collected while the tracking service is off, or control over whether or not the data is eventually reported for analysis).

It will be understood that one or more components of the vehicle monitor 145 (e.g., the controller 147) may be characterized as a vehicle monitor circuit, and that any circuit providing the functionality described herein as being provided by the vehicle monitor 145 may be referred to as a "vehicle monitor circuit."

4. The Server 155

The server 155 is a computer system that may include a controller 157 (e.g., including a memory 159 and a processor 161), a communication interface 163, and a set of user interface (UI) components 165 (e.g., including an input component 167 and an output component 169). The server 155 may be any suitable server or computer system capable of hosting software to enable server/client functionality.

One or more of the UI components 165 may be the same as, or similar to, the previously described UI components 115 and 135. The memory 159 may include (i) a set of instructions 160 that, when implemented by the processor 161, cause the processor 161 to perform one or more operations described herein with respect to the server 155, or (ii) data 162 (e.g., including input data on which the processor 161 may operate or output data generated by the processor 161). Specifically, the memory 159 may include a ML model (sometimes "ML MDL") 164 and input or output data for the ML model 164 (e.g., stored as the data 162) that is used for training or implementing the ML model 164.

In example operation, the server 155 may receive data representing one or more positions or one or more orientations of a mirror or seat in the vehicle 103. The positions or orientations may have been originally obtained by the mirror or seat controllers 172/174, and may have been transmitted from the controller 172/174 to the OBC 125, which then relayed the positions or orientations to the server 155. If desired, the controller 172/174 may transmit the position or orientation to the server 155 without routing the data via OBC 125. Regardless, the server 155 may receive the data. The server 155 may use the received data to train the ML model 164 (e.g., by implementing the methods shown in FIGS. 4 and 5). If desired, the server 155 may coordinate with any one or more components of the in-vehicle computer system 104 to detect or predict a driver's identity, activate a tracking-mode particular to the predicted identity to enable tracking of the driver's behavior, analyze tracked behavior, and activate any desired personalized services particular to the predicted driver (e.g., activating a set of preferences for the driver; see FIG. 6).

While FIG. 1 shows the server 155 storing the ML model 164, any one or more of the of the server 155, mobile device 105, OBC 125, or vehicle monitor 145 may train or implement the ML model 164 in some embodiments. In some embodiments, one system or device may train the ML model 164, while another implements it. For example, the server 155 may train the ML model 164 using data collected from any one or more of the devices 105-145. After the ML model 164 has been trained, it may be transmitted to one of the devices 105-145 for implementation (e.g., for real-time analysis of position or orientation data to predict a driver identity). In an embodiment, the system 100 may implement the ML model 164 by collecting position or orientation data by any one or more of the devices 105-145 and then transmitting the collected data to the server 155. The server 155 may analyze the position or orientation data by feeding it to the ML model 164. The resulting output of the ML model 164 when fed this input may be a predicted driver identity. The server 155 may then transmit the driver identity to any one or more of the devices 105-145 or may activate any suitable personalized driver-based service discussed herein.

5. The Seat and Mirror Controllers 172 and 174

The seat controller 172 is any suitable set of circuits and motors configured to adjust a driver seat of the vehicle 103. The seat controller 172 may include or otherwise be communicatively connected to a motor driver for any one or more of: seat height, seat forward/backward, seat tilt, seat back tilt, seat length, seat width, headrest height, headrest tilt, lumbar support, or seat fan. FIG. 8 depicts an example electronic seat system of which a seat controller, such as the seat controller 172, may be a part. FIG. 8 also shows example motors for adjusting seat components and motor drivers.

The seat controller 172 may control a position or orientation of a seat or seat component in response to a user actuating a physical or "soft" switch or actuator (e.g., a switch on a door panel or console, or a virtual button on a display in the center console) or in response to the system 100 automatically detecting a driver's identity without the driver's explicit input (e.g., based on a key fob, a mobile phone, a mirror position or orientation, etc.) and causing the seat controller 172 (e.g., by transmitting a command to the mirror controller 172) to adjust the position or orientation of one or more seat components in accordance with a predefined user preference regarding the one or more seat components.

The mirror controller 174 is any suitable set of circuits and motors configured to adjust a mirror or mirror component of the vehicle 103. The mirror controller 174 may include or otherwise be communicatively connected to a motor driver for any one or more of: lateral or side-to-side position of the mirror, longitudinal or forward/back position (i.e., depth), height or vertical position of the mirror, rotation of the mirror around the longitudinal, lateral, or vertical axis, etc. FIG. 9 depicts an example electronic mirror system of which a mirror controller, such as the mirror controller 174, may be a part. FIG. 9 also shows example motors for adjusting a mirror and motor drivers for driving the motors.

The mirror controller 174 may control a position or orientation of a mirror in response to a user actuating a physical or "soft" switch or actuator (e.g., a switch on a door panel or console, or a virtual button on a display in the center console) or in response to the system 100 automatically detecting a driver's identity without the driver's explicit input (e.g., based on a key fob, a mobile phone, a seat position or orientation, etc.) and causing the mirror controller 174 (e.g., transmitting a command to the mirror controller 174) to adjust the position or orientation of one or more mirrors in accordance with a predefine user preference for the one or more mirrors.

C. Other Aspects of the Vehicle Computer System 100

Depending on the embodiment, the vehicle computer system 100 may have various configurations. For example, in an embodiment the vehicle computer system 100 may include only the in-vehicle system 104. In other words, the functionality of the vehicle computer system 100 may be provided entirely by the in-vehicle system 104 in some embodiments. As such, the vehicle computer system 100 may be a "stand-alone" system that does not require connection to an external network such as the network 199 in some embodiments.

In some embodiments (and as shown in FIG. 1), the vehicle computer system 100 may be a distributed system in which the functionality of the vehicle computer system 100 is divided between the components 105-174. If desired, the functionality described herein may be divided in any suitable fashion between the server 155 (and any desired number of similar servers or databases) and any one or more of the components of the in-vehicle computer system 104. For example, although the vehicle computer system 100 is shown including one server 155, one mobile device 105, one OBC 125, and one vehicle monitor 145, it will be understood that zero, one, or a plurality of each may be utilized depending on the embodiment.

In an embodiment, the processing performed by the server 155 or the components of the in-vehicle system 104 may be distributed among a plurality of servers in an arrangement referred to as "cloud computing." This configuration may provide several advantages, such as enabling near real-time uploads and downloads of information as well as periodic uploads and downloads of information. This may enable a thin-client embodiment of the mobile device 105, the OBC 125, or the vehicle monitor 145, as well as a primary backup of some or all of the data gathered by the mobile any of the devices 105, 125, or 145.

Further, if desired, a database (e.g., implemented by the server 155) may store data related to the operation of the vehicle computer system 100. Such data might include, for example, data collected by the mobile device 105, the OBC 125, the vehicle monitor 145, the mirror controller 172, or the seat controller 174. Such data (e.g., any suitable number of parameter values representing position(s) or orientation(s) of any desired number of seats or mirrors of the vehicle 103) may pertain to the vehicle computer system 100 and may be uploaded to the server 155 (e.g., images, sensor inputs, data analyzed according to the methods discussed below, or other kinds of data). The server 155 may access data stored in such a database when executing various functions and tasks associated with the operation of the vehicle computer system 100. The data in such a database may be stored at one or more memory devices such as the memory 159 that are included within, or otherwise communicatively connected to, the server 155.

In an embodiment, any one or more of the devices 105, 125, and 145 may drive any one or more of the displays 119, 139, and 169 if desired. Further, it will be appreciated that any one or more of the UI components 115, 135, or 165 may be referred to as "UI devices."

Below, the example vehicles 200 and the example clusters 300 of sets of parameter values representing position(s) or orientation(s) pertaining to a seat or mirror of the vehicle 103 (e.g., detected via any suitable combination of the devices 105, 125, 145, 172, and 174) are described in more detail before turning to the example methods 400-600, which may be implemented by the system 100.

II. Example Vehicles 200a-200i

Turning to FIGS. 2A-2I, various embodiments of vehicle computer systems 200a-200i are shown, each of which may be similar to the vehicle computer system 100 shown in FIG. 1 and each of which may provide the same or similar functionality to that described regarding the system 100. The vehicle computer systems 200a-200i include vehicles 205a-205i, each of which may include the in-vehicle computer system 104 shown in FIG. 1 or some version thereof.

Specifically, the system 104 may be implemented utilizing any of the following vehicles: (a) an automobile 205a as shown in FIG. 2A; (b) a motorcycle 205b as shown in FIG. 2B; (c) a watercraft (e.g., yacht or commercial ship) 205c as shown in FIG. 2C; (d) a commercial automobile (e.g., a semi-truck) 205d as shown in FIG. 2D; (e) a personal watercraft (e.g., a jet-ski) 205e as shown in FIG. 2E; (f) an aircraft 205f as shown in FIG. 2F; (g) a recreational vehicle (e.g., a camper) 205g as shown in FIG. 2G; (h) a train 205h as shown in FIG. 2H; or (i) a four-wheeler 200i as shown in FIG. 2I.

Regarding the motorcycle 205b, position or orientation data may pertain to (i) any suitable position or orientation of an adjustable seat on which the primary rider rides, or (ii) any suitable position or orientation of a mirror of the motorcycle 205b, such as the side mirrors.

Regarding the watercraft 205c, position or orientation data may pertain to (i) any suitable position or orientation of an adjustable seat on which a captain or controller pilots the watercraft 205c, or (ii) any suitable position or orientation of a mirror of the watercraft 205c. Likewise, for the other vehicles 205d-205j, position or orientation data may pertain to (i) any suitable position or orientation of an adjustable seat on which a driver/captain/pilot/controller controls the relevant vehicle 205d-j, or (ii) any suitable position or orientation of a mirror of the relevant vehicle 205d-j.

III. Example Graph 300 of Clusters

FIG. 3 depicts an example graph 300 including a plurality of points (representing a plurality of sets of parameter values) in which three distinct clusters are identifiable by the system 100 (shown in FIG. 1), according to an embodiment. The graph 300 includes a cluster 302, a cluster 304, and a cluster 306.

Each point shown on the graph 300 represents a single set of parameter values (e.g., corresponding to a single driving session) detected, e.g., by the system 100. The clusters 302-306 may be identified by the system 100 when analyzing the plurality of sets of parameter values detected over any number of desired driving sessions. After identifying the clusters 302-306, the system 100 may assign a driver identity to each set within the cluster to indicate that the sets within a given cluster appear to be associated with a single particular driver. For example, the system 100 may label cluster 302 as "Alice" so that each set in cluster 302 is assigned "Alice;" label cluster 304 as "Bob" so that each set in cluster 304 is assigned "Bob;" and label cluster 306 as "Charlie" so that each set in cluster 306 is assigned "Charlie." Thus, each point or set within the cluster 302 represents a detected set of parameter values, corresponding to a driving session, that the system 100 attributes to the driver identity "Alice."

The driver identity may correspond to an actual driver identity (e.g., corresponding to a name on the driver's insurance policy), or may be a temporary identity that is later cross referenced and linked with a "real" identity (e.g., a unique identity included in or otherwise associated with a driver's insurance policy). The system 100 may utilize the plurality of sets and labels for the clusters to train a ML model (e.g., using any suitable supervised learning technique). Later, the system 100 may implement the ML model to evaluate current or real-time parameter values and predict a driver identity based on the cluster to which the current parameter values mostly closely correspond. For example, if a current set falls within the dashed oval for cluster 302, the ML model 164 may predict that the current driver is Alice.

As shown, each set includes two parameters (e.g., a longitudinal position of a seat base and a pitch of the seat base). However, appreciate that in some embodiments, each set or point may include or represent any desired number of parameters. For example, each set may represent a combination of values along 18 different dimensions (e.g., three positions and three orientations/tilts for a seat back, three positions and three orientations/tilts for a seat bottom, and three positions and three orientations/tilts for a head rest). Further, mirror positions or orientations may be alternatively or additionally included in each set. As a result, a set may represent a combination of values along 24 different dimensions (e.g., including the previous 18, as well as six different dimensions for a rearview mirror) or a combination of values along 36 different dimensions (e.g., including the previously mentioned dimensions, as well as six different dimensions for a driver side mirror and six different dimensions for a passenger side mirror). Note, it may be difficult to visually depict points or sets including parameter values along more than three dimensions or axes (given that each distinct parameter requires an axis), but the system 100 can nevertheless characterize the sets according to any desired number of parameters or dimensions, and can identify clusters from groups of such sets.

In an embodiment, each set of parameter values may represent a single parameter value. In such an example, the points would be placed along a single line or axis.

To identify the clusters 302-306 (or any other desired cluster), the system 100 may utilize any desired clustering algorithm or analysis. For example, the system 100 may implement any of the following to identify the clusters described herein: connectivity-based clustering or hierarchical clustering; centroid-based clustering (e.g., using k-means clustering); distribution-based clustering; density-based clustering such as DBSCAN; grid-based clustering, or any other suitable clustering algorithm or technique.

IV. Example Methods 400-600

As explained below, (A) FIG. 4 depicts an example method 400 for collecting training data and implementing unsupervised learning techniques to identify clusters of position or orientation data, according to an embodiment; (B) FIG. 5 depicts an example method 500 for training, evaluating, and utilizing a ML model for predicting a driver identity based on data, acquired via one or more sensor systems, representing position(s) or orientation(s), according to an embodiment; and (C) FIG. 6 depicts an example method 600 for implementing a ML model to predict a driver identity, according to an embodiment.

Before elaborating on the methods 400-600, it should be noted that, depending on the implementation, the techniques and ML model(s) described herein may implement or rely on supervised learning, unsupervised learning, or semi-supervised learning. Unsupervised learning is a learning process for generalizing the underlying structure or distribution in unlabeled data. In an embodiment utilizing unsupervised learning, the system 100 may rely on unlabeled position or orientation data (i.e., data representing position or orientation without label(s) indicating the driver associated with position or orientation of the seat or mirror in question, for example). During unsupervised learning, natural structures or patterns are identified and exploited for relating instances to each other (e.g., identifying distinct clusters of parameters or data from which a label might be estimated or guessed). The method 400 relies on unsupervised learning techniques to identify distinct clusters of sets of positions or orientations. The system 100 then assigns driver identities to those clusters (e.g., based on user input or a key fob or a simple estimate).

Supervised learning is a learning process for generalizing on problems where a prediction is required. A "teaching process" compares predictions by the model for a set of inputs (e.g., position or orientation measurements) to known answers or labeled data (e.g., known drivers corresponding to the position or orientation measurements) and makes corrections in the model. The method 500 relies on supervised learning techniques to train the ML model 164.

Semi-supervised learning can use a mixture of supervised and unsupervised techniques. This learning process discovers and learns the structure in the input variables, where typically some of the input data is labeled, and most is unlabeled. The training operations discussed herein may rely on any one or more of supervised, unsupervised, or semi-supervised learning, depending on the embodiment.

A. The Example Method 400

As noted, FIG. 4 illustrates an example method 400 for collecting training data and implementing unsupervised learning techniques to identify clusters of position or orientation data, according to an embodiment. The method 400 may be implemented, in whole or in part, by the system 100 shown in FIG. 1. The method 400 may be saved to a memory (e.g., any one or more of the memories 109, 129, 149, or 159) as one or more instructions or routines.

The method 400 begins at a step or block 405 when the system 100 collects, over a period of time, training data representing position or orientation of a driver seat or a mirror. In some instances, the training data may represent any desired set of parameters. For example, the training data represents values for two parameters: a longitudinal position of a seat base and a pitch (rotation around the lateral axis) of a seat back. In another example, the training data represents values for 18 parameters: three positions and three orientations/tilts for a seat back, three positions and three orientations/tilts for a seat base, and three positions and three orientations/tilts for a head rest. Alternatively, or additionally, the training data may represent one or more 6DOF parameter values pertaining to one or more mirrors.

In some instances, the training data includes positions/orientations for one or more passenger seats. This may ultimately be helpful due to a process of elimination. For example, if a first driver is predicted as being seated in a passenger seat due to the passenger adjusting the passenger seat to a particular position or orientation, the model 164 may weight against predicting that the first driver is in the driver seat (because he cannot occupy two seats at the same time). The system 100 may collect training data over any suitable number of driving sessions or times. The time period for collection may be a preconfigured time, a time selected by one or more drivers of the vehicle in question, or a time period necessary to identify and distinguish the plurality of clusters with a level of confidence exceeding a predetermined threshold (e.g., with a 90%, 95%, 98%, or any other suitable percent confidence that a particular number of distinct clusters have been identified and represent distinct drivers).

At a step 410, the system 100 analyzes the training data to identify clusters of position or orientation. For example, the system 100 may determine that the training data can largely be clustered or categorized into four groups or clusters. Each cluster may represent any suitable combination of 6DOF parameter value ranges. For example, each cluster may represent a unique combination of: (i) a particular range of seat back tilts, (ii) a particular range of seat base positions, and (iii) a particular range of rear-view mirror pitch/yaw/rolls. Accounting for more parameters may improve the accuracy of the system 100. For example, a first and second driver in a household may share a common seat back tilt, while the second and third share a similar rear-view mirror orientation. By accounting for the three different mentioned parameters, the system 100 may identity three distinct clusters for these drivers, despite having overlapping preferences for certain positions or orientations. Because the steps 405 and 410 involve analyzing unlabeled training data to learn distinct clusters over a period of time, these steps may be thought of as part of an unsupervised learning function.

At a step 415, the system 100 assigns driver identities to clusters to create labelled training data. The assigned driver identities may be unique identifiers associated with the drivers (e.g., a driver's license number, a unique username, etc.) or may be temporary identities that are later correlated with IDs that are elsewhere linked to the drivers (e.g., in insurance policy records). In some instances, the system 100 detects a key fob unique to a particular driver identity, enabling a strong "guess" as to the driver's identity. In some instances, the system 100 prompts the user, at the beginning or end of a driving session (e.g., via a display of the mobile device 105 or the OBC 125) to provide or confirm his or her identity. In some embodiments, the system 100 prompts the user to provide a biometric marker (e.g., fingerprint scan, eye scan or picture, face scan or picture, etc.). The system 100 may analyze a database linking biometric markers to driver identities to determine a driver identity corresponding to the biometric marker. In some instances, the system 100 automatically obtains the biometric marker (e.g., without prompting the user to take an action, such as looking at a camera or placing a fingerprint on a scanner). For example, the system 100 may automatically capture an image of the driver's eye(s) or face when the driver enters the vehicle. As another example, a steering wheel may include one or more fingerprint scanners that automatically scan the driver's fingerprint(s) when he or she grips the steering wheel. In some embodiments, a unique identifier associated with the mobile device 105 is detected when the driver enters the vehicle 103, and this unique identifier is used to determine the driver identity. The unique identifier could be any suitable ID unique to the driver 105 or driver, and may be transmitted via any suitable wireless connection (e.g., wifi, Bluetooth, NFC, etc.).

At a step 420, the system 100 trains a ML model (e.g., the model 164) using the labelled training data. In short, by evaluating each set of parameter values representing a particular orientation and/or position for a driver, and the driver identity assigned to the set, the model 164 learns an algorithm for predicting the drive based on the position or orientation alone. In short, the model 164 learns "boundaries" regarding position or orientation measurements that enable it to classify that set as being either likely associated with the driver in question or likely not associate with the driver in question. Below, model training is described in more detail with reference to the method 500 shown in FIG. 5.

B. The Example Method 500

As noted, FIG. 5 illustrates an example method 500 for training, evaluating, and utilizing a ML model for predicting a driver identity based on data, acquired via one or more sensor systems, representing position(s) or orientation(s), according to an embodiment. The method 500 may be implemented, in whole or in part, by the system 100 shown in FIG. 1. The method 500 may be saved to a memory (e.g., any one or more of the memories 109, 129, or 149) as one or more instructions or routines.

At a high level, the method 500 includes a step 502 for model design and preparation, a step 504 for model training and evaluation, and a step 506 for model deployment. Generally speaking, the method 500 represents a technique for supervised learning wherein labeled data is used for training.

1. Machine Learning Model Preparation (Block 502)

The step 502 may include the steps or sub-steps 524 and 528, which may be implemented in any suitable order. At the step 524, the ML model 164 receives, one or more first training data sets indicative of one or more position(s) or orientation(s) (e.g., of a driver seat or mirror). The training data used in step 524 may be the training data reference above with respect to step 420 of method 400.

At the step 528, the ML model 164 receives test data for testing or validating the model 164. In a typical example, the ML model 164 is implemented on a set of labeled training data (e.g., position or orientation data labeled with driver identities) to determine the extent to which it accurately predicts a driver's identity based on position or orientation.

2. Machine Learning Model Training (Block 504)

The step 504 may include any one or more steps or sub-steps 542-546, which may be implemented in any suitable order. In a typical example, at step 542, the ML model 164 is trained by running the one or more training data sets described above. At step 544, the system 100 evaluates the model 164, and at the step 546, the system 100 determines whether or not the model 164 is ready for deployment before either proceeding to step 506 or returning to step 542 to further develop, test, or validate the model.

Regarding the sub-step 542 of the step 504, developing the model typically involves training the model using training data. At a high level, machine-learning models are often utilized to discover relationships between various observable features (e.g., between predictor features [position or orientation measurements in this example] and target features [driver identities in this example]) in a training dataset, which can then be applied to an input dataset to predict unknown values for one or more of these features given the known values for the remaining features. These relationships are discovered by feeding the model training data including instances each having one or more predictor feature values and one or more target feature values. The model then "learns" an algorithm capable of calculating or predicting the target feature values (e.g., driver identities) given the predictor feature values (e.g., positions or orientations of a driver seat or mirror(s)).

Regarding the sub-step 544 of the step 504, evaluating the model typically involves testing the model using testing data or validating the model using validation data. Testing/ validation data typically includes both predictor feature values and target feature values, enabling comparison of target feature values predicted by the model to the actual target feature values, enabling one to evaluate the performance of the model. This testing/validation process is valuable because the model, when implemented, will generate target feature values for future input data that may not be easily checked or validated. Thus, it is advantageous to check one or more accuracy metrics of the model on data for which you already know the target answer (e.g., testing data or validation data), and use this assessment as a proxy for predictive accuracy on future data. Example accuracy metrics include key performance indicators, comparisons between historical trends and predictions of results, cross-validation with subject matter experts, comparisons between predicted results and actual results, etc.

Regarding the sub-step 546 of the step 504, the system 100 may utilize any suitable set of metrics to determine whether or not to proceed to the step 506 for model deployment. Generally speaking, the decision to proceed to the step 506 or to return to the step 542 will depend on one or more accuracy metrics generated during evaluation (the step 544). After the sub-steps 542-546 of the step 504 have been completed, the system 100 may implement the step 506.

3. Machine Learning Model Implementation (Block 506)

The step 506 may include any one or more steps or sub-steps 562-568, which may be implemented in any suitable order. In a typical example, the system 100 collects input data (e.g., position or orientation data) (step 562), loads the input data into the ML model 164 (step 564), runs the ML model 164 with the input data (step 566), and stores results generated from running the ML model 164 to memory (step 568).

Note, the method 500 may be implemented in any desired order and may be at least partially iterative. That is, the step 502 may be implemented after the step 504 or after the step 506 (e.g., to collect new data for training, testing, or validation), and the step 504 may be implemented after the step 506 (e.g., to further improve the model via training or other development after deployment).

C. The Example Method 600 for Implementing a ML Model to Predict a Driver Identity As noted, FIG. 6 depicts the example method 600 for implementing a ML model (e.g., the model 164) to predict a driver identity based on position or orientation data (e.g., representing one or more positions or orientations of: (i) one or more components of a driver's seat, (ii) one or more components of one or more passenger seats, (iii) one or more components of one or more mirrors, or (iv) some combination thereof. The method 600 may be implemented, in whole or in part, by the system 100 and ML model 164 shown in FIG. 1. The method 600 may be saved to a memory (e.g., any one or more of the memories 109, 129, or 149) as one or more instructions or routines. While the method 600 is described with reference to the system 100, it will be appreciated that any suitable system and machine learning model may, alternatively or additionally, implement the method 600.

The method begins at a step 605 when the system 100 detects parameter values representing a current position or orientation of a seat or mirror.

At a step 610, the system 100 feeds the parameter values to the ML model 164 to predict a driver identity based on a cluster to which the parameter values most closely correspond. During the training operation, the ML model 164 may have developed an algorithm or formula for evaluating the cluster to which a given set of inputs most closely corresponds. For example, the ML model 164 may have "learned" that three drivers in a household each have a unique triplet of yaw, pitch, and roll for the rearview mirror. When a first driver adjusts the rearview mirror, the model 164 may determine that the yaw/pitch/roll measurements fall within a range expected for the first driver, and may thus "predict" that the first driver is driving the vehicle. In some embodiments, the ML model 164 may be capable of reaching an "inconclusive" prediction, indicating that the current set of inputs does not correspond to a known cluster. This outcome may arise when a new driver, on which the ML model 164 was not trained, drives the vehicle 103.

At a step 615, the system 100 activates a personalized driver-based service linked to the predicted driver identity. For example, the system 100 may modify in-vehicle settings or preferences according to a driver's preferences. Example in-vehicle settings may include settings pertaining to radio station, thermostat, driving mode (e.g., economy, sport, regular, 4×4, etc.), suspension (e.g., stiffer for improved handling, softer for improved comfort), interior lighting, autonomous or semi-autonomous features, safety features (e.g., driver notification settings regarding lane deviation, nearby vehicles, desired proximity during adaptive cruise control, etc.), or any other desired setting. In some embodiments, a driver's preferences may "follow" her to any of a number of vehicles she chooses to drive. As an example, if a person or family owns three cars, any one or more of the previously described preferences may be "set" when the driver gets in the cockpit of any of the three cars, adjusts her seat or mirror position or orientation, and is recognized by one of the systems disclosed herein. Each of the three cars may have an in-vehicle system similar to the system 104 shown in FIG. 1, and each may communicate with the server 155.

In an embodiment, activating the driver-based service may include utilizing the driver's profile (e.g., including parameters representing driver tendencies regarding acceleration, lane deviation, braking patterns, traffic violations, etc.) when communicating with networked vehicles on the road to alert other drivers or vehicles of the driver's type (e.g., indicating a level of aggressiveness) or to allow autonomous or semi-autonomous systems of the other vehicles to account for the driver's tendencies.

In some embodiments, the driver may opt-in to a driver-based or usage-based insurance program (e.g., rather than vehicle based), and activating the driver-based service may include "activating" the driver's insurance while she is driving, wherein the system 100 tracks the driver while he or she is driving (e.g., so that the driver's rate or premium is adjustable based on actual behavior, thereby incentivizing safe behaviors). If desired, the insurance policy may "follow" the driver to cover her regardless of the vehicle he or she is driving, enabling a driver to obtain a single driver-based policy that will cover her for any of a number of cars she may drive.

Similarly, in some embodiments, the system 100 may operate to enable a driver's preferences to "follow" her to any of a number of vehicles she chooses to drive. As an example, if a person or family owns three cars, the system 100 may operate to enable any one or more of the previously described preferences to be "set" when the driver enters the cockpit of any of the three cars, adjusts her seat or mirror position or orientation, and is recognized by one of the systems disclosed herein. In this sense, one or more aspects of the system 100 may be thought of as a control system for accurately personalizing a driver's environment, regardless of the vehicle he or she is driving.

In an embodiment, the activated service includes a tracking-mode that causes the system 100 to detect and store data representing driving behavior such that the data linked to a profile associated with the predicted driver identity. In some instances, the tracked behavior may relate to position of the vehicle, speed of the vehicle, acceleration of the vehicle, braking activity of the vehicle, turn radius, distance from other vehicles, distance from obstacles, gaze tracking of the driver (e.g., to determine how often the driver is watching the road or getting distracted looking at a phone), hand position relative to the steering wheel, etc.

At a step 620, the system 100 analyzes tracked driving behavior. The tracked driving behavior may be used to automatically update (e.g., in real-time if desired) a dynamic usage-based insurance plan.

V. Example Vehicle Environments 700-900

FIG. 7 depicts an example vehicle environment 700, including a vehicle 703 and an example coordinate system 701, according to an embodiment. The vehicle 703 may be similar to the vehicle 103 shown in FIG. 1, and any one or more components of the in-vehicle computer system 104 shown in FIG. 1 may be implemented at the vehicle 703 or any other suitable vehicle.

Generally speaking, unless noted otherwise, the positions and orientations described herein reference a coordinate system such as the coordinate system 701. That is, a longitudinal position or orientation (e.g., of a driver seat or mirror) references the axis "x" shown in FIG. 7 extending from the front of the reference vehicle (e.g., the vehicle 103 or the vehicle 705) to the back of the reference vehicle. Rotation around the longitudinal axis may be referred to as "roll."

Similarly, a lateral position or orientation references the axis "y" extending from the driver side of the vehicle to the passenger side of the vehicle (e.g., through the center of the vehicle). Rotation around the lateral axis may be referred to as "pitch."

Finally, a vertical position or orientation references the axis "z" shown in FIG. 7 extending from the top of the vehicle 705 to the bottom of the vehicle 705 (e.g., through the center of the vehicle). Rotation around the vertical axis may be referred to as "yaw."

FIG. 8 depicts an example vehicle environment 800 including a driver seat 801 and a set of electromechanical components 880 for the driver seat 801, according to an embodiment. The driver seat 801 includes a seat base 802, a seat back 804 (including a lumbar support 805), and a headrest 806. The driver 801 may include any other suitable component adjustable to manipulate the position, orientation, or pressure exerted on a driver in the seat 801. At a high level, the system 100 may transmit or receive any desirable message to the components 880. For example, the system 100 may transmit a message to cause the components 880 to drive one or more components of the seat 801 to a desired position or orientation. As another example, one or more of the components 880 may transmit to the system 100 a sensed (or last known/commanded) position or orientation of any of the components of the seat 801.

The components 880 include a set of motors 872 configured to adjust the position or orientation (along any of the three axes shown in FIG. 7) of any one or more of the components 802-806 of the seat 801; a set of motor drivers 881 electrically connected to, and configured to drive, the motors 872; a seat controller 883 communicatively connected to the motor drivers 881 and configured to cause the motor drivers 881 to activate or engage to thereby set a desired change in position or orientation; and one or more sensors 885 configured to detect a position or orientation of any one or more of the seat components 802-806 of the seat 801. The seat controller 883 may be communicatively connected to (e.g., via any suitable wired or wireless link), and responsive to, any one or more of the devices 105, 125, or 145 shown in FIG. 1.

Each of the seat components 801 may be positionally or rotationally adjustable along any of the three axes. For example, in some embodiments, each may be moved side to side (laterally), front to back (longitudinally), up and down (vertically). Likewise, in some embodiments, each may be rotated along any one or more of the longitudinal, lateral, or vertical axis. In some embodiments, one or more of the seat components 801 may be adjustable or rotatable zero, one, two, or all three of the axes. For example, in an embodiment, the lumbar support is only adjustable relative to the driver along the longitudinal axis (e.g., it may extend forward toward the driver or backward away from the driver). In any event, any one of the positions or rotations along any of the three axes, for any one of the seat components 801, may be utilized by the system 100 for training or implementing the ML model 164 to predict a driver based on position or orientation of one or more of the seat components 801. In some instances, the ML model 164 may also account for position or orientation of one or more passenger seats, which may have components similar to the components 802-806 shown in FIG. 1.

FIG. 9 depicts an example vehicle environment 900 including a rearview mirror 902, a driver sideview mirror 904, a passenger sideview mirror 906, and a set of electromechanical components 980 for the mirrors 902-904, according to an embodiment. The components 980 include a set of motors 972 configured to adjust the position or orientation (along any of the three axes shown in FIG. 7) of any one or more of the mirrors 902-906; a set of motor drivers 981 electrically connected to, and configured to drive, the motors 972; a mirror controller 983 communicatively connected to the motor drivers 981 and configured to cause the motor drivers 981 to activate or engage to thereby set a desired change in position or orientation; and one or more sensors 985 configured to detect a position or orientation of any one or more of the mirrors 902-906. The mirror controller 983 may be communicatively connected to (e.g., via any suitable wired or wireless link), and responsive to, any one or more of the devices 105, 125, or 145 shown in FIG. 1. More generally, the system 100 may transmit or receive any desirable message to the components 980. For example, the system 100 may transmit a message to cause the components 880 to drive one or more of the mirrors 902-906 to a desired position or orientation. As another example, one or more of the components 980 may transmit to the system 100 a sensed (or last known/commanded) position or orientation of any of the mirrors 902-906.

Each of the mirrors 902-904 may be positionally or rotationally adjust along any of the three axes. For example, in some embodiments, each may be moved side to side (laterally), front to back (longitudinally), up and down (vertically). Likewise, in some embodiments, each may be rotated along any one or more of the longitudinal, lateral, or vertical axis. In some embodiments, one or more of the mirrors 902-906 may be rotatable but may have a relatively fixed center. In any event, any one of the positions or rotations along any of the three axes may be utilized by the system 100 for training or implementing the ML model 164 to predict a driver based on position or orientation of one or more of the mirrors 902-906.

VI. Additional Considerations

With the foregoing, an insurance customer may opt-in to a rewards, insurance discount, or other type of program. After the insurance customer provides their affirmative consent, an insurance provider remote server may collect data from the customer's mobile device, smart home controller, or other smart devices-such as with the customer's permission or affirmative consent. The data collected may be related to vehicle operation or insured assets before (or after) an insurance-related event, including those events discussed elsewhere herein. In return, risk averse insureds may receive discounts or insurance cost savings related to vehicle, life or other types of insurance from the insurance provider.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the methods 400-600 specifically, the described functions may be implemented, in whole or in part, by the devices, circuits, or routines of the system 100 shown in FIG. 1. The described methods may be embodied by a set of circuits that are permanently or semi-permanently configured (e.g., an ASIC or FPGA) to perform logical functions of the respective methods or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising." "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

Further, the patent claims at the end of this document are not intended to be construed under 35 U.S.C. § 112 (f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

VII. General Terms and Phrases

Throughout this specification, some of the following terms and phrases are used.

Cloud/Cloud Computing. The phrase "cloud computing" generally refers to a variety of concepts involving a large number of computers connected through a network (e.g., the Internet). In common usage, "the cloud" is often a metaphor for the Internet. "In the cloud" often refers to software, platforms, and infrastructure sold "as a service" (i.e., remotely through the Internet). The supplier of these services generally utilizes servers hosting products and services from a remote location, enabling individual users to access these products and services via the servers while requiring the users to install little if any software on their end-user devices. Example models of cloud computing services may be referred to as "software as a service," "platform as a service." and "infrastructure as a service." Cloud services may be offered in a public, private, or hybrid networks and may be implemented on hosts provided by third-party cloud vendors.

Communication Interface. Some of the described devices or systems include a "communication interface" (sometimes referred to as a "network interface"). For example, each of the systems 105, 125, 145, and 155 may include a communication interface. Each of the described communication interfaces enables the system of which it is a party to (i) send information or data to other systems or components or (ii) receive information or data from other systems or components. A communication interface configured to enable a system to couple to a peripheral device (e.g., a keyboard, a monitor, an external hard drive, etc.) may be referred to as a "peripheral interface" or "I/O interface" (see "I/O interface"). In some instances, one or more of the described communication interfaces may be utilized to establish a direct connection to another system. In some instances, one or more of the described communication interfaces enable the system(s) of which they are a part to connect via a link to a network (e.g., a personal area network (PAN), a local area network (LAN), or a wide area network (WAN)).

If desired, the described communication interfaces may include (i) circuitry that enables connection to a wired link that carries electrical or optical signals to another device (e.g., via a coax cable or fiber optic cable) and to communicate with that other device, or (ii) circuitry that enables wireless communication (e.g., short-range or long-range communication) via electromagnetic signals, such as radio frequency (RF) signals. Further, in some instances a described communication interface may refer to multiple interfaces for communicating with components or systems external to a system. For example, in some instances, a described communication interface may refer to a set of communication interfaces including: one or more wired communication interfaces, one or more wireless communication interfaces, and one or more I/O or peripheral interfaces. The described communication interfaces and systems may conform to any one or more suitable communications protocols, standards, or technologies, such as those described herein Communication Protocols. In this description, communication protocols, standards, and technologies may be referred to generically as "communication protocols." Example communication protocols, standards, or technologies that may be utilized by the described systems include those that facilitate communication via nanoscale networks, near-field networks, personal area networks ("PANs"), local area networks ("LANs"), backbone networks, metropolitan area networks ("MANs"), wide area networks ("WANs"), Internet area networks ("IANs"), or the Internet.

Example near-field network protocols and standards include typical radio-frequency identification ("RFID") standards or protocols and near-field communication ("NFC") protocols or standards. Example PAN protocols and standards include 6LoWPAN, Bluetooth (i.e., a wireless standard for exchanging data between two devices using radio waves in the range of approximately 2.4 to 2.485 GHZ), IEEE 802.15.4-2006, ZigBee, the Thread protocol, ultra-wideband ("UWB"), universal serial bus ("USB") and wireless USB, and ANT+. Example LAN protocols and standards include the 802.11 protocol and other high frequency protocols/systems for wireless communication in bands found in a range of approximately 1 GHZ-60 GHZ (e.g., including the 900 MHZ, 2.4 GHZ, 3.6 GHZ, 5 GHZ, or 60 GHz bands), as well as standards for suitable cabling such as coaxial and fiber-optic cabling. Example technologies used to facilitate wireless WANs includes those used for LANs, as well as 2G (e.g., GPRS and EDGE), 3G (e.g., UMTS and CDMA2000), 4G (e.g., LTE and WiMax), and 5G (e.g., IMT-2020) technologies. Note, the Internet may be considered a WAN.

Other communication protocols and standards that may be utilized include BitTorrent, Bluetooth Bootstrap Protocol ("BOOTP"), Domain Name System ("DNS"), Dynamic Host Configuration Protocol ("DHCP"), Ethernet, file transfer protocol ("FTP"), hypertext transfer protocol ("HTTP"), infrared communication standards (e.g., IrDA or IrSimple), transmission control protocol/internet protocol ("TCP/IP") (e.g., any of the protocols used in each of the TCP/IP layers), real-time transport protocol ("RTP"), real-time streaming protocol ("RTSP"), Simple Mail Transfer Protocol ("SMTP"), Simple Network Management Protocol ("SNMP"), Simple Network Time Protocol ("SNTP"), secure shell protocol ("SSH"), and any other communications protocol or standard, or any combination thereof.

Communication Link. Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber-optic connections for transmission of light and (ii) wireless links such as wireless electromagnetic signals that carry information via changes made to one or more properties of electromagnetic waves.

As noted, a wireless link may be a wireless electromagnetic signal that carries information via changes made to one or more properties of an electromagnetic wave(s). A wireless electromagnetic signal may be a microwave or radio wave and may be referred to as a radio frequency or "RF" signal. Unless otherwise stated, described RF signals may oscillated at a frequency within any one or more bands found in the spectrum of roughly 30 kHz to 3,000 GHz (e.g., an 802.11 signal in the 2.4 GHz band). Example RF bands include the low frequency ("LF") band at 30-300 kHz, the medium frequency ("MF") band at 300-3,000 kHz, the high frequency ("HF") band at 3-30 MHZ, the very high frequency ("VHF") band at 30-300 MHZ, the ultra-high frequency ("UHF") band at 300-3,000 MHZ, the super high frequency ("SHF") band at 3-30 GHZ, the extremely high frequency ("SHF") band at 30-300 GHZ, and the tremendously high frequency ("THF") band at 300-3,000 GHZ.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Computer. Generally speaking, a computer or computing device is a programmable machine having two principal characteristics. Namely, it responds to a set of instructions in a well-defined manner and can execute a prerecorded list of instructions (e.g., a program or routine). A computer according to the present disclosure is a device with a processor and a memory. For purposes of this disclosure, examples of a computer include a server host, a personal computer, (e.g., desktop computer, laptop computer, netbook), a mobile communications device (such as a mobile "smart" phone), and devices providing functionality through internal components or connection to an external computer, server, or global communications network (such as the Internet) to take direction from or engage in processes which are then delivered to other system components.

Database. Generally speaking, a "database" is an organized collection of data, generally stored and accessed electronically from a computer system. Generally, any suitable datastore may be referred to as a "database." This disclosure may describe one or more databases for storing information relating to aspects of the disclosure. The information stored on a database can, for example, be related to a private subscriber, a content provider, a host, a security provider, etc. A server (which may or may not be hosted on the same computer as the database) may act as an intermediary between the database and a client by providing data from the database to the client or enabling the client to write data to the database. One of ordinary skill in the art appreciates any reference to "a database" my refer to multiple databases, each of which may be linked to one another.

Display Device. Generally speaking, the terms "display device" or "display" refer to an electronic visual display device that provides visual output in the form of images, text, or video. The described display devices (e.g., 119, 139, 169) may be any display, screen, monitor, or projector suitable for displaying visual output (e.g., images or video output). Example displays include LED screens, LCD screens, CRT screens, projectors, heads up displays, smart watch displays, headset displays (e.g., VR goggles), etc.

Graphic User Interface (GUI). See "User Interface."

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Message. When used in the context of communication networks, the term "message" refers to a unit of communication, represented by a set of data, transmitted or received by a node (e.g., via a link). The set of data representing the message may include a payload (i.e., the content intended to be delivered) and protocol overhead. The overhead may include routing information and metadata pertaining to the protocol or payload (e.g., identifying the protocol for the message, the intended recipient node, the originating node, the size of the message or payload, data integrity information for checking the integrity of the message, etc.). In some instances, a packet or sequence of packets may be thought of as a message.

Network. As used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

Each of the described networks (e.g., the networks 101 and 199) may include dedicated routers, switches, or hubs responsible for forwarding or directing traffic between nodes, and, optionally, dedicated devices responsible for configuring and managing the network. Some or all of the nodes of the described networks may be adapted to function as routers in order to direct traffic sent between other network devices. Nodes of the described networks may be inter-connected in a wired or wireless manner, and may have different routing and transfer capabilities. For example, dedicated routers may be capable of high-volume transmissions while some nodes may be capable of sending and receiving relatively little traffic over the same period of time. Additionally, the connections between nodes on the described networks may have different throughput capabilities and different attenuation characteristics. A fiberoptic cable, for example, may be capable of providing a bandwidth several orders of magnitude higher than a wireless link because of the difference in the inherent physical limitations of the medium. Each of the described networks may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor. The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating." "determining." "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine." "module," or "application" described in this disclosure refers to a set of computer-readable instructions that may be stored on a CRM. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Each routine may be represented by code implemented in any desired language, such as source code (e.g., interpretable for execution or compilable into a lower level code), object code, bytecode, machine code, microcode, or the like. The code may be written in any suitable programming or scripting language (e.g., C, C++, Java, Actionscript, Objective-C, Javascript, CSS, Python, XML, Swift, Ruby, Elixir, Rust, Scala, or others).

Server. Generally speaking, a server is a program or set of routines that manages network resources or services to provide functionality for other programs or devices called "clients." Servers are typically hosted by a host computer, and this host computer may itself be referred to as a "server." Example servers include database servers, file servers, mail servers, print servers, web servers, game servers, and application servers. Servers may be dedicated (e.g., wherein the software and hardware are used exclusively or nearly exclusively for server functions) or virtual (e.g., wherein the server is hosted by a virtual machine on a physical machine or wherein the server shares hardware or software resources of a single machine with another operating system).

User Interface (UI). Generally speaking, a user interface refers to the components of a computer system by which a user and the computer system interact. The UI components may be hardware, software, or some combination thereof, and may include UI input components, UI output components, or some combination thereof. In some embodiments, any one or more of the UI components 115, 135, or 165 shown in FIG. 1 may include any one or more of the example UI components listed below.

Example UI output components include: (i) visual output components such as lights (e.g., LEDs) and electronic displays (e.g., LCD, LED, CRT, plasma, projection displays, heads-up displays, etc.), (ii) audio output components such as speakers, and (iii) motion generating components such as motors that provide haptic feedback.

Example UI input components include: (i) mechanical or electrical components for detecting physical or touch input, such as hardware actuators (e.g., those used for a keyboard, a mouse, "hard" buttons found on a tablet or phone, etc.) or electrical sensors (e.g., resistive or capacitive touch sensors); (ii) audio sensors (e.g., microphones) for detecting audio input, such as voice commands; (iii) image sensors for detecting image or video input, such as those found in a camera (e.g., enabling facial recognition input or gesture input without requiring the user to touch the device); and (iv) motion sensors (e.g., accelerometers, gyroscopes, etc.) for detecting motion of the computer system itself (e.g., enabling a user to provide input by rotating or otherwise moving the computer system).

Some systems (e.g., the mobile device 105, the OBC 125, etc.) provide a graphical user interface (GUI) by way of a UI output component such as an electronic display (e.g., any of the displays 119, 139, 169, or 300). Generally speaking, a GUI is generated via a routine and enables a user to interact with indicators and other graphic elements displayed on at the electronic display. Generally speaking, the graphic elements of a GUI may be output elements (i.e., conveying some sort of information to the user), control elements (i.e., being user "interactable" to cause the execution of an action by the system), or both (e.g., an icon may include an image representing a browser and may be interacted with to launch the browser).

Example GUI control elements include buttons (e.g., radio buttons, check boxes, etc.), sliders, list boxes, spinner elements, drop-down lists, menus, menu bars, toolbars, interactive icons, text boxes, windows that can be moved or minimized and maximized, etc.

What is claimed is:

1. A method for automatically predicting driver identities and activating personalized driver-based services, the method comprising:
   A) acquiring a plurality of sets of parameter values, wherein each set of parameter values: (i) corresponds to a different one of a plurality of driving sessions and (ii) includes one or more values representing an orientation or position of a driver seat in a vehicle for the driving session to which it corresponds and a second one or more parameter values representing an orientation or position of a second seat in the vehicle for the driving session, the second seat being a seat other than the driver seat;
   B) implementing a training operation including:
      (i) identifying a plurality of clusters of sets from the plurality of sets of parameter values such that the plurality of sets of parameter values is grouped according to the plurality of clusters;
      (ii) assigning a driver identity to each of the plurality of cluster wherein each driver identity represents a different one of a plurality of driver identities;
      (iii) assigning each of the plurality of sets of parameter values one of the plurality of driver identities based on the cluster with which each of the plurality of sets of parameter values is associated; and
      (iv) training a machine-learning (ML) model using the plurality of sets of parameter values and the corresponding plurality of driver identities; and C) implementing, via an in-vehicle computer system, the ML model including:
  (i) acquiring a current set of parameter values representing a current orientation or position of the driver seat in the vehicle while a current driver is driving and a second one or more parameter values representing an orientation or position of the second seat in the vehicle for the driving session, the orientation or position of the driver seat and the second seat used to predict a predicted driver identity;
  (ii) in response to acquiring the current set of parameter values predicting the predicted driver identity of the current driver by selecting, as the predicted driver identity, one of the plurality of driver identities based on which of the plurality of clusters the current set of parameter values most closely corresponds; and
  (iii) in response to predicting the predicted driver identity, controlling a position or orientation of various components in a cockpit, and activating a tracking-mode particular to the predicted driver identity to collect and store driving behavior data such that the driving behavior data is linked to the predicted driver identity and referenceable to analyze driving behavior particular to the current driver, wherein vehicle sensors are configured to collect the driving behavior data upon activating the tracking mode.

2. The method of claim 1, wherein each set of parameter values further includes: a second one or more parameter values representing an orientation or position of a mirror in the vehicle.

3. The method of claim 1, wherein assigning each of the plurality of sets of parameter values one of the plurality of driver identities comprises: detecting each of the plurality of driver identities via one or more key fobs associated with the driver identities.

4. The method of claim 1, wherein assigning each of the plurality of sets of parameter values one of the plurality of driver identities comprises: automatically capturing biometric information of a plurality of drivers and determining the plurality of driver identities based on the captured biometric information.

5. The method of claim 1, wherein assigning each of the plurality of sets of parameter values one of the plurality of driver identities comprises: causing an electronic user interface component disposed in the vehicle to request user input indicating the driver identity from a plurality of drivers and determining the plurality of identities based on the user input.

6. The method of claim 5, wherein the user input is biometric information manually provided by the user, and wherein determining the plurality of identities based on the user input comprises determining the plurality of driver identities based on the biometric information.

7. The method of claim 5, wherein the user input is text input indicating the driver identity or a button activation confirming or selecting a driver identity.

8. The method of claim 1, wherein acquiring the plurality of sets of parameter values comprises acquiring the plurality of sets of parameter values over a preconfigured time period.

9. The method of claim 1, wherein acquiring the plurality of sets of parameter values comprises acquiring the plurality of sets of parameter values over a time period set by one or more drivers of the vehicle.

10. The method of claim 1, wherein acquiring the plurality of sets of parameter values comprises acquiring the plurality of sets of parameter values over a time period determined by an extent to which the clusters can be identified as corresponding to distinct drivers with a confidence exceeding a threshold.

11. The method of claim 1, wherein controlling the position or orientation of various components in the cockpit is based on a set of stored preferences linked to the predicted driver identity.

12. A system for automatically predicting driver identities and activating personalized driver-based services, the system comprising:
  one or more sensor systems configured to acquire a plurality of sets of parameter values, wherein each set of parameter values: (i) corresponds to a different one of a plurality of driving sessions and (ii) includes one or more values representing an orientation or position of a driver seat in a vehicle for the driving session to which it corresponds and a second one or more parameter values representing an orientation or position of a second seat in the vehicle for the driving session, the second seat being a seat other than the driver seat;
  a server coupled to the one or more sensors systems and configured to receive the plurality of sets of parameter values from the one or more sensor systems, wherein the server is further configured to implement a training operation in which the server:
    (i) identifies a plurality of clusters of sets from the plurality of sets of parameter values such that the plurality of sets of parameter values is grouped according to the plurality of clusters;
    (ii) assigns a driver identity to each of the plurality of clusters, wherein each driver identity represents a different one of a plurality of driver identities;
    (iii) assigns each of the plurality of sets of parameter values one of the plurality of driver identities based on the cluster with which each of the plurality of sets of parameter values is associated; and
    (iv) trains a machine-learning (ML) model using the plurality of sets of parameter values and the corresponding plurality of driver identities; and
  an in-vehicle computer system coupled to the server and configured to implement the ML model, wherein the in-vehicle computer system:
    (i) acquires a current set of parameter values representing a current orientation or position of the driver seat in the vehicle while a current driver is driving and a second one or more parameter values representing an orientation or position of the second seat in the vehicle for the driving session, the orientation or position of the driver seat and the second seat used to predict a predicted driver identity;
    (ii) in response to acquiring the current set of parameter values, predicts the predicted driver identity of the current driver by selecting, as the predicted driver identity, one of the plurality of driver identities based on which of the plurality of clusters the current set of parameter values most closely corresponds; and
    (iii) in response to predicting the predicted driver identity, controls a position or orientation of various components in a cockpit, and activates a tracking-mode particular to the predicted driver identity to collect and store driving behavior data such that the driving behavior data is linked to the predicted driver identity and referenceable to analyze driving behavior particular to the current driver, wherein vehicle sensors are configured to collect the driving behavior data upon activating the tracking mode.

13. The system of claim 12, wherein to assign each of the plurality of sets of parameter values one of the plurality of driver identities, the server is further configured to detect each of the plurality of driver identities via one or more key fobs associated with the driver identities.

14. The system of claim 12, wherein to assign each of the plurality of sets of parameter values one of the plurality of driver identities, the server is further configured to capture biometric information of a plurality of drivers and determining the plurality of driver identities based on the captured biometric information.

15. The system of claim 12, wherein to acquire the plurality of sets of parameter values, the in-vehicle computer system is further configured to acquire the plurality of sets of parameter values over a preconfigured time period.

16. The system of claim 12, wherein to acquire the plurality of sets of parameter values, the in-vehicle computer system is further configured to acquire the plurality of sets of parameter values over a time period set by one or more drivers of the vehicle.

17. The system of claim 12, wherein to acquire the plurality of sets of parameter values, the in-vehicle computer system is further configured to acquire the plurality of sets of parameter values over a time period determined by an extent to which the clusters can be identified as corresponding to distinct drivers with a confidence exceeding a threshold.

18. The system of claim 12, wherein to control the position or orientation of various components in the cockpit is based on a set of stored preferences linked to the predicted driver identity.

19. The method of claim 1, wherein the vehicle sensors comprise a vehicle monitor device.

20. The system of claim 12, wherein the vehicle sensors comprise a vehicle monitor device.

\* \* \* \* \*